US011968570B2

(12) United States Patent
Nagaraja et al.

(10) Patent No.: US 11,968,570 B2
(45) Date of Patent: Apr. 23, 2024

(54) TECHNIQUES FOR HANDOVERS IN THE PRESENCE OF DIRECTIONAL WIRELESS BEAMS

(71) Applicant: QUALCOMM Incorporated, San Diego, CA (US)

(72) Inventors: Sumeeth Nagaraja, San Diego, CA (US); Ajay Gupta, San Diego, CA (US); Vinod Menon, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 15/703,460

(22) Filed: Sep. 13, 2017

(65) Prior Publication Data

US 2018/0084473 A1    Mar. 22, 2018

Related U.S. Application Data

(60) Provisional application No. 62/396,149, filed on Sep. 17, 2016.

(51) Int. Cl.
*H04W 36/00* (2009.01)
*H04W 24/04* (2009.01)
(Continued)

(52) U.S. Cl.
CPC ....... *H04W 36/0066* (2013.01); *H04W 24/04* (2013.01); *H04W 36/0077* (2013.01);
(Continued)

(58) Field of Classification Search
CPC ............. H04W 36/00; H04W 36/0005; H04W 36/0016; H04W 36/0055; H04W 36/0058;
(Continued)

(56) References Cited

U.S. PATENT DOCUMENTS 7,379,750 B2   5/2008 Jalali
9,467,915 B2   10/2016 Park et al.
(Continued)

FOREIGN PATENT DOCUMENTS

CN    103096372 A    5/2013
CN    103686893 A    3/2014
(Continued)

OTHER PUBLICATIONS

ISA/EP, International Search Report and Written Opinion of the International Searching Authority, Int'l Application No. PCT/US2017/051511, dated Dec. 18, 2017, European Patent Office, Rijswijk, NL, 15 pgs.
(Continued)

*Primary Examiner* — Redentor Pasia
(74) *Attorney, Agent, or Firm* — Holland & Hart LLP

(57) ABSTRACT

Techniques are disclosed for handover of a user equipment (UE) from a serving base station to a target base station. A target base station may use one or more directional beams to establish wireless communication links with UEs within a coverage area of the target base station. Directional beams may create a narrow-beam, high-bandwidth connection with a UE in a limited geographic area. Handover procedures include some latency between when a target base station dedicates resources to a UE and when the UE executes a communication via those dedicated resources. To compensate for latencies in a handover procedure and for the geographic limitations of directional beams, a target base station may assign multiple directional beams to the UE during a handover procedure. Each directional beam may be associated with access parameters used by the UE to generate messages (e.g., a RACH message) during the handover procedure.

58 Claims, 17 Drawing Sheets

(51) Int. Cl.
*H04W 36/08* (2009.01)
*H04W 72/044* (2023.01)
*H04W 74/0833* (2024.01)

(52) U.S. Cl.
CPC ... *H04W 36/0079* (2018.08); *H04W 74/0833* (2013.01); *H04W 36/08* (2013.01); *H04W 72/046* (2013.01)

(58) Field of Classification Search
CPC ......... H04W 36/0066; H04W 36/0072; H04W 36/0077; H04W 36/0083; H04W 36/0085; H04W 36/0079; H04W 36/08; H04W 24/04; H04W 74/0833; H04W 72/046
See application file for complete search history.

(56) References Cited

U.S. PATENT DOCUMENTS

| | | | | |
|---|---|---|---|---|
| 2009/0046641 | A1* | 2/2009 | Wang | H04W 74/002 370/329 |
| 2009/0296609 | A1* | 12/2009 | Choi | H04W 72/121 370/281 |
| 2014/0022972 | A1* | 1/2014 | Ahn | H04W 36/0072 370/311 |
| 2014/0219244 | A1 | 8/2014 | Prakash et al. | |
| 2014/0321282 | A1* | 10/2014 | Pragada | H04W 28/10 370/235 |
| 2014/0321430 | A1 | 10/2014 | Bakker et al. | |
| 2015/0257073 | A1 | 9/2015 | Park et al. | |
| 2016/0037425 | A1 | 2/2016 | Van Lieshout et al. | |
| 2016/0095018 | A1 | 3/2016 | Vajapeyam et al. | |
| 2016/0249269 | A1* | 8/2016 | Niu | H04W 56/0095 |
| 2016/0337916 | A1* | 11/2016 | Deenoo | H04W 8/22 |
| 2016/0381681 | A1 | 12/2016 | Nogami et al. | |
| 2017/0006539 | A1* | 1/2017 | Kakishima | H04B 7/0639 |
| 2017/0034866 | A1* | 2/2017 | Wager | H04W 76/27 |
| 2017/0055187 | A1* | 2/2017 | Kang | H04W 36/0069 |
| 2017/0181134 | A1* | 6/2017 | Niu | H04B 17/318 |
| 2017/0215117 | A1* | 7/2017 | Kwon | H04W 36/32 |
| 2017/0302355 | A1* | 10/2017 | Islam | H04W 72/042 |
| 2017/0303188 | A1* | 10/2017 | Fitch | H04W 36/0061 |
| 2017/0346545 | A1* | 11/2017 | Islam | H01Q 1/245 |
| 2018/0084473 | A1* | 3/2018 | Nagaraja | H04W 36/30 |
| 2018/0249388 | A1* | 8/2018 | Baek | H04W 36/02 |
| 2019/0028942 | A1* | 1/2019 | Tang | H04W 36/0061 |
| 2019/0081688 | A1* | 3/2019 | Deenoo | H04L 5/0069 |
| 2019/0174384 | A1* | 6/2019 | Kim | H04W 56/001 |

FOREIGN PATENT DOCUMENTS

| | | |
|---|---|---|
| CN | 104871597 A | 8/2015 |
| CN | 105556869 A | 5/2016 |
| CN | 105900487 A | 8/2016 |
| EP | 2741556 A1 | 6/2014 |
| JP | 2018512097 A | 5/2018 |
| WO | WO-2006105300 | 10/2006 |
| WO | WO-2014196295 A1 | 12/2014 |
| WO | WO-2015089303 A1 | 6/2015 |
| WO | WO-2015156575 A1 | 10/2015 |
| WO | WO-2016053836 | 4/2016 |
| WO | WO-2016123429 A1 | 8/2016 |
| WO | WO-2018030872 A1 | 2/2018 |

OTHER PUBLICATIONS

Samsung: "Evaluation Results on Wideband CSI Reporting for FD-MIMO," 3GPP TSG RAN Meeting #83, R1-156794, Nov. 15-22, 2015, 5 pages.

Taiwan Search Report—TW106131533—TIPO—dated Jun. 10, 2021.

* cited by examiner

TECHNIQUES FOR HANDOVERS IN THE PRESENCE OF DIRECTIONAL WIRELESS BEAMS

CROSS REFERENCES

The present application for patent claims priority to U.S. Provisional Patent Application No. 62/396,149 by Nagaraja, et al., entitled "TECHNIQUES FOR HANDOVERS IN THE PRESENCE OF DIRECTIONAL WIRELESS BEAMS," filed Sep. 17, 2016, assigned to the assignee hereof.

BACKGROUND

The following relates generally to a handover of a user equipment (UE) from a serving base station to a target base station, and more specifically to techniques for handovers in the presence of directional wireless beams.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipments (UEs).

In some instances, a handover procedure of a UE between base stations may be executed to maintain the connectivity of the UE to the wireless communication system. Such a handover procedure may include some latency between communications.

SUMMARY

The described techniques relate to improved methods, systems, devices, or apparatuses that support techniques for handovers in the presence of directional wireless beams. Generally, the described techniques provide that a target base station may use one or more directional beams to establish wireless communication links with UEs within a coverage area of the target base station. Directional beams may create a narrow-beam, high-bandwidth connection with a UE in a limited geographic area. Handover procedures include at least some latency between when a target base station dedicates resources to a UE and when the UE executes a communication via those dedicated resources. During this latency, the UE may move out of the effective range of the directional beam dedicated to the UE. To compensate for latencies in a handover procedure and for the geographic limitations of directional beams, a target base station may assign multiple directional beams to be used by the UE during a handover procedure. Each directional beam may be associated with access parameters used by the UE to generate messages (e.g., a random access channel (RACH) message) during the handover procedure.

A method of a handover of a UE from a serving base station to a target base station is described. The method may include receiving a measurement report, generating, by the target base station based at least in part on the measurement report, a first message comprising access parameters for each of a plurality of directional wireless communication links between the UE and the target base station, and transmitting the first message to the UE via the serving base station.

An apparatus for a handover of a UE from a serving base station to a target base station is described. The apparatus may include means for receiving a measurement report, means for generating, by the target base station based at least in part on the measurement report, a first message comprising access parameters for each of a plurality of directional wireless communication links between the UE and the target base station, and means for transmitting the first message to the UE via the serving base station.

Another apparatus for a handover of a UE from a serving base station to a target base station is described. The apparatus may include a processor, memory in electronic communication with the processor, and instructions stored in the memory. The instructions may be operable to cause the processor to receive a measurement report, generate, by the target base station based at least in part on the measurement report, a first message comprising access parameters for each of a plurality of directional wireless communication links between the UE and the target base station, and transmit the first message to the UE via the serving base station.

A non-transitory computer readable medium for a handover of a UE from a serving base station to a target base station is described. The non-transitory computer-readable medium may include instructions operable to cause a processor to receive a measurement report, generate, by the target base station based at least in part on the measurement report, a first message comprising access parameters for each of a plurality of directional wireless communication links between the UE and the target base station, and transmit the first message to the UE via the serving base station.

Some examples of the method, apparatus, and non-transitory computer-readable medium described above may further include processes, features, means, or instructions for selecting the plurality of directional wireless communication links to include in the first message from a total number of directional wireless communication links associated with the target base station.

Some examples of the method, apparatus, and non-transitory computer-readable medium described above may further include processes, features, means, or instructions for determining values for the access parameters for each directional wireless communication link. In some cases, the determined values for the access parameters are based at least in part on estimated latency, network traffic, mobility parameters of the UE, availability of communication resources, or a combination thereof.

Some examples of the method, apparatus, and non-transitory computer-readable medium described above may further include processes, features, means, or instructions for establishing a communication link with the UE using at least one of the directional wireless communication links. In some cases, the at least one of the directional wireless communication links used was included in the first message.

In some examples of the method, apparatus, and non-transitory computer-readable medium described above, the first message dedicates random access channel (RACH) resources to the UE.

In some examples of the method, apparatus, and non-transitory computer-readable medium described above, the access parameters include a preamble index, a physical random access channel (PRACH) mask index, or a beam index for each directional wireless communication link included in the first message.

In some examples of the method, apparatus, and non-transitory computer-readable medium described above, the access parameters include a response window for each directional wireless communication link included in the first message, the response window including a start time and a duration for the UE to monitor the directional wireless communication link associated with the response window.

In some examples of the method, apparatus, and non-transitory computer-readable medium described above, the response window associated with one or more of the directional wireless communication links does not overlap with response windows associated with other directional wireless communication links.

In some examples of the method, apparatus, and non-transitory computer-readable medium described above, the access parameters include a transmission window for each directional wireless communication link included in the first message, the transmission window being indicative of a dedicated time period to receive a second message from the UE via a specific directional wireless communication link of the plurality of directional wireless communication links.

In some examples of the method, apparatus, and non-transitory computer-readable medium described above, the access parameters include priority information associated with the plurality of directional wireless communication links, the priority information being indicative of a ranking of the plurality of directional wireless communication links.

Some examples of the method, apparatus, and non-transitory computer-readable medium described above may further include processes, features, means, or instructions for receiving a second message from the UE via one of the directional wireless communication links included in the first message based at least in part on the access parameters included in the first message.

Some examples of the method, apparatus, and non-transitory computer-readable medium described above may further include processes, features, means, or instructions for transmitting a response to the second message via the one of the directional wireless communication links included in the first message.

In some examples of the method, apparatus, and non-transitory computer-readable medium described above, the second message may be a RACH message.

Some examples of the method, apparatus, and non-transitory computer-readable medium described above may further include processes, features, means, or instructions for receiving a second message via each of the directional wireless communication links included in the first message. Some examples of the method, apparatus, and non-transitory computer-readable medium described above may further include processes, features, means, or instructions for transmitting a response via each of the directional wireless communication links included in the first message.

In some examples of the method, apparatus, and non-transitory computer-readable medium described above, the measurement report and the first message may be relayed between the UE and the target base station by the serving base station.

In some examples of the method, apparatus, and non-transitory computer-readable medium described above, the plurality of directional wireless communication links may be millimeter wave (mmW) communication links.

A method of a handover of a UE from a serving base station to a target base station is described. The method may include transmitting a measurement report, receiving, at the UE, a first message comprising access parameters for each of a plurality of directional wireless communication links between the UE and the target base station, the first message being based at least in part on the measurement report, and transmitting a second message via at least one of the directional wireless communication links based at least in part on the access parameters included in the first message.

An apparatus for a handover of a UE from a serving base station to a target base station is described. The apparatus may include means for transmitting a measurement report, means for receiving, at the UE, a first message comprising access parameters for each of a plurality of directional wireless communication links between the UE and the target base station, the first message being based at least in part on the measurement report, and means for transmitting a second message via at least one of the directional wireless communication links based at least in part on the access parameters included in the first message.

Another apparatus for a handover of a UE from a serving base station to a target base station is described. The apparatus may include a processor, memory in electronic communication with the processor, and instructions stored in the memory. The instructions may be operable to cause the processor to transmit a measurement report, receive, at the UE, a first message comprising access parameters for each of a plurality of directional wireless communication links between the UE and the target base station, the first message being based at least in part on the measurement report, and transmit a second message via at least one of the directional wireless communication links based at least in part on the access parameters included in the first message.

A non-transitory computer readable medium for a handover of a UE from a serving base station to a target base station is described. The non-transitory computer-readable medium may include instructions operable to cause a processor to transmit a measurement report, receive, at the UE, a first message comprising access parameters for each of a plurality of directional wireless communication links between the UE and the target base station, the first message being based at least in part on the measurement report, and transmit a second message via at least one of the directional wireless communication links based at least in part on the access parameters included in the first message.

Some examples of the method, apparatus, and non-transitory computer-readable medium described above may further include processes, features, means, or instructions for determining a response window for each directional wireless communication link. In some cases, the determining of the response window for each directional wireless communication link is based at least in part on the access parameters included in the first message.

Some examples of the method, apparatus, and non-transitory computer-readable medium described above may further include processes, features, means, or instructions for monitoring a selected directional wireless communication link during the response window for a response to the second message, the response window being associated with the selected directional wireless communication link.

In some examples of the method, apparatus, and non-transitory computer-readable medium described above, the response window associated with one or more of the directional wireless communication links does not overlap with response windows associated with any other of the directional wireless communication links.

Some examples of the method, apparatus, and non-transitory computer-readable medium described above may further include processes, features, means, or instructions for receiving at least one response to the second message via at least one selected directional wireless communication link of the plurality of directional wireless communication links during a response window associated with the at least one selected directional wireless communication link.

Some examples of the method, apparatus, and non-transitory computer-readable medium described above may further include processes, features, means, or instructions for measuring a first signal strength of the serving base station and a second signal strength of the target base station. Some examples of the method, apparatus, and non-transitory computer-readable medium described above may further include processes, features, means, or instructions for generating the measurement report based at least in part on the first signal strength and the second signal strength.

In some examples of the method, apparatus, and non-transitory computer-readable medium described above, the first message may dedicate random access channel (RACH) resources to the UE.

Some examples of the method, apparatus, and non-transitory computer-readable medium described above may further include processes, features, means, or instructions for selecting one or more directional wireless communication links of the plurality of directional wireless communication links. In some cases, the selecting one or more directional wireless communication links may be based at least in part on priority information. In some cases, the selecting one or more directional wireless communication links may be based at least in part on channel conditions measured by the UE of the directional wireless communication links.

Some examples of the method, apparatus, and non-transitory computer-readable medium described above may further include processes, features, means, or instructions for determining a mobility state of the UE. Some examples of the method, apparatus, and non-transitory computer-readable medium described above may further include processes, features, means, or instructions for generating the measurement report that includes the mobility state of the UE.

In some examples of the method, apparatus, and non-transitory computer-readable medium described above, the second message may be a RACH message.

DETAILED DESCRIPTION

Figure 1:
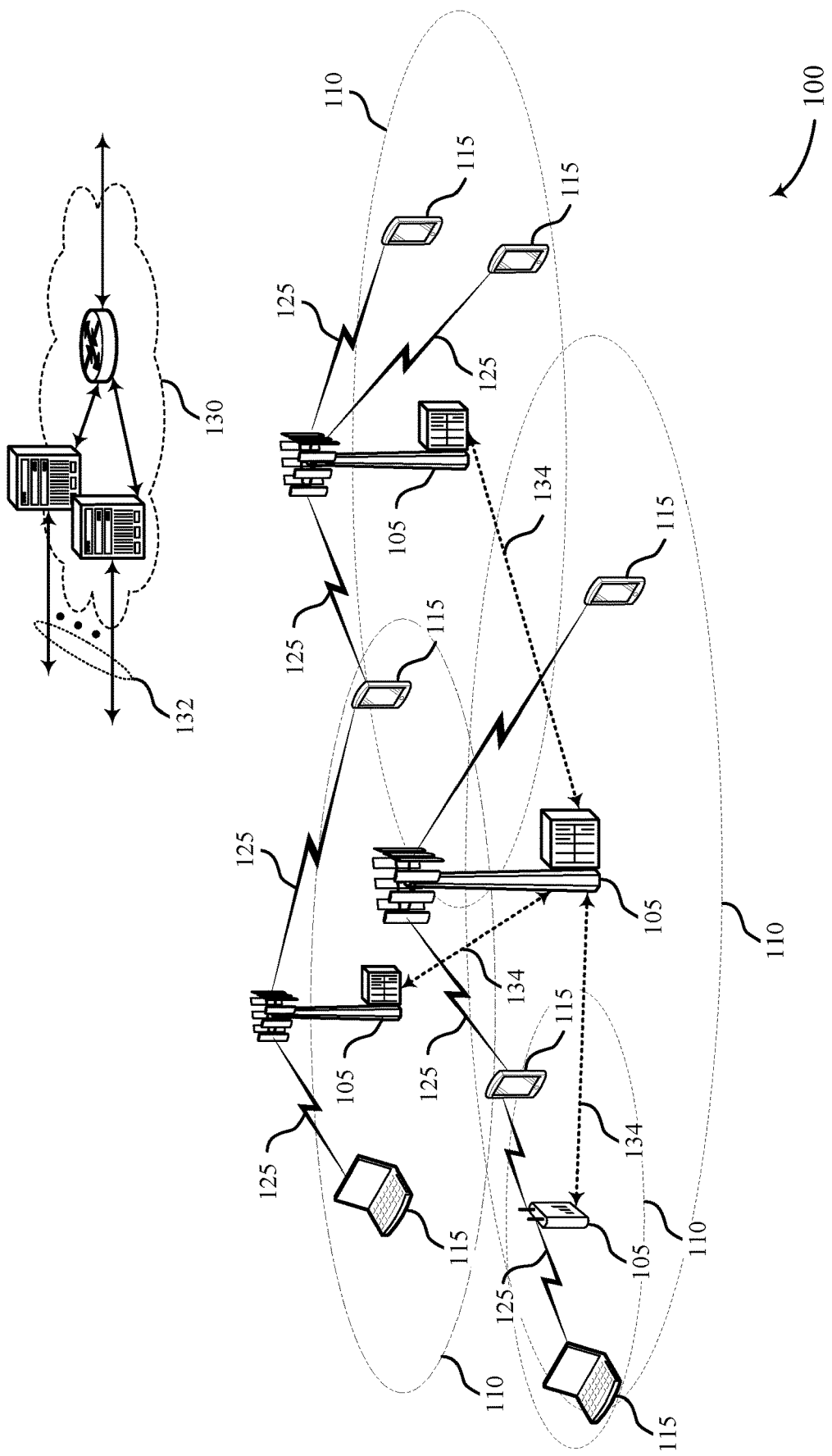
FIG. 1 illustrates an example of a system for a handover of a UE from a serving base station to a target base station that supports techniques for handovers in the presence of directional wireless beams in accordance with aspects of the present disclosure.

Techniques are described herein for use during handover procedures when directional wireless beams are used to establish communication links between base stations and UEs. In some handover procedures, such as in a non-contention handover in LTE, a target base station may generate a configuration message (e.g., a RRCConnectionReconfiguration message) that dedicates some random access channel (RACH) resources to the UE during the handover procedure. Because a direct communication link between the UE and the target base station has yet to be established, the configuration message may be relayed to the UE by a source base station. After the UE receives the configuration message, the UE may decode the message, generate RACH messages based at least in part on the configuration message, and transmit the RACH messages. These operations introduce some latency between when the RACH resources are dedicated by the target base station and when the dedicated RACH resources are used by the UE.

In addition, a target base station may utilize directional wireless beams to establish communication links with UEs in its coverage area. Wireless communication links achieved through beamforming may be associated with narrow beams (e.g., "pencil beams") that are highly directional, minimize and/or reduce inter-link interference, and provide high-bandwidth links, but the beams are also effective in a limited geographic area. In some examples, the target base station may operate in millimeter wave (mmW) frequency ranges.

The latency in the handover procedure combined with the limited effective geographic areas of directional beams may cause a handover procedure to fail. If a target base station dedicates a single directional beam resource to a UE during a handover procedure, the UE may move out of the effective range of the single directional beam resource between the time that the resource is dedicated and the time that the UE attempts to use the resource. As a result, during the latency in the handover procedure, the UE may move out of the range of the resource dedicated by the target base station.

Techniques are described herein to assign multiple directional beams to the UE during a handover procedure. The target base station may select a plurality of directional beams to dedicate to the UE during the handover procedure. The target base station may then determine access parameters for each of the plurality of directional beams selected. The target base station may include the plurality of directional beams and the access parameters in the configuration message. Because the UE does not know which directional beam will be most effective to establish a communication a link with the target base station, the UE may generate and transmit one or more RACH messages on each of the plurality of directional beams included in the configuration message. In this manner, a handover procedure in the presence of directional beams may be executed more reliably.

Aspects of the disclosure are initially described in the context of a wireless communications system. Aspects of the disclosure are illustrated by and described with reference to communication scheme diagrams related to handover procedures. Aspects of the disclosure are further illustrated by and described with reference to apparatus diagrams, system diagrams, and flowcharts that relate to techniques for handovers in the presence of directional wireless beams.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. Techniques are described herein that account for latency in a handover procedure and the use of directional wireless beams to establish communication links between a base station 105 and a UE 115. As discussed herein, multiple directional wireless beams may be used in a handover procedure to address the challenges described. In addition, access parameters associated with the directional wireless beams may be used by the UE 115 to execute aspects of a handover procedure.

Base stations 105 may wirelessly communicate with UEs 115 via one or more base station antennas. Each base station 105 may provide communication coverage for a respective geographic coverage area 110. As UEs 115 move through the coverage areas 110, the UE 115 may be "handed-over" to other base stations 105 in order to maintain connectivity. Such events may be referred to as handovers. To execute a handover, a number of different handover procedures may be defined by the wireless communications system 100 (e.g., contention handover procedures or non-contention handover procedures).

Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). In some instances, base stations 105 may communicate directly with each other via backhaul links 134 to initiate a handover procedure for a UE 115. Base stations 105 may perform radio configuration and scheduling for communication with UEs 115, or base stations 105 may operate under the control of a base station controller (not shown). In some examples, base stations 105 may be macro cells, small cells, hot spots, or the like. Base stations 105 may also be referred to as eNodeBs (eNBs) 105.

Figure 2:
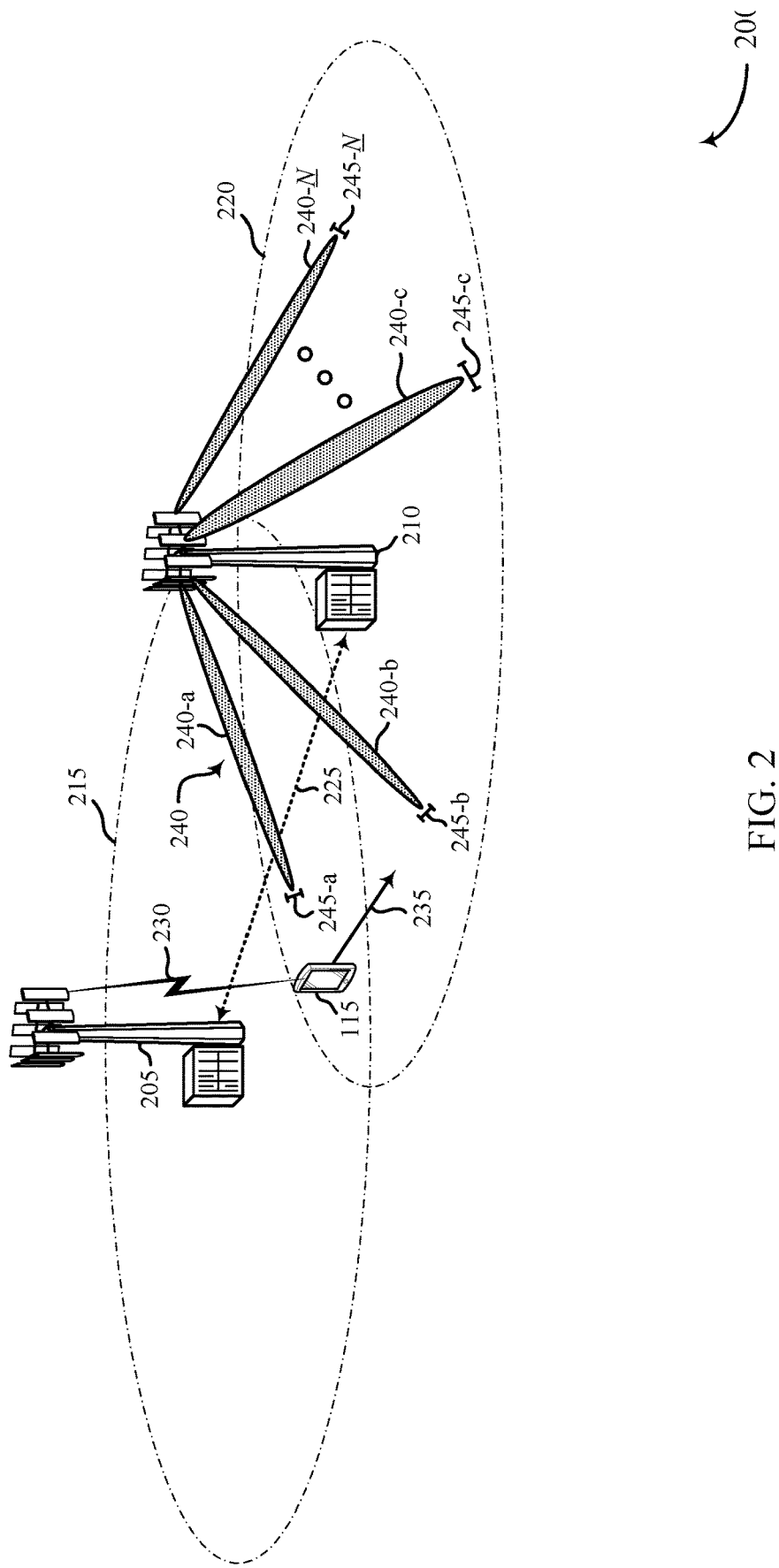
FIG. 2 illustrates an example of a block diagram of a wireless communication system that supports techniques for handovers in the presence of directional wireless beams in accordance with aspects of the present disclosure.

FIG. 2 illustrates an example of a block diagram of a wireless communication system 200 for techniques for handovers in the presence of directional wireless beams. The wireless communication system 200 may be an example of the wireless communication system 100 discussed with reference to FIG. 1. The wireless communication system 200 includes a serving base station 205 and a target base station 210. Coverage areas 215, 220 may be defined for their respective base stations 205, 210. The serving base station 205 and the target base station 210 may be examples of the base stations 105 described with reference to FIG. 1. As such, features of the base stations 205, 210 may be similar to those of the base stations 105.

The serving base station 205 and the target base station 210 may communicate via a backhaul link 225. The backhaul link 225 may be a wired backhaul link or a wireless backhaul link. The backhaul link 225 may be configured to communicate data and other information between the serving base station 205 and the target base station 210. The backhaul link 225 may be an example of the backhaul links 134 described in reference to FIG. 1.

The serving base station 205 may establish a communication link 230 with a UE 115. The communication link 230 may be an example of the communication links 125 described with reference to FIG. 1. One characteristic of UEs 115 in a wireless communication system 200 is that the UEs 115 may be mobile. Because UEs 115 may change their geophysical location in the wireless communication system 200, to maintain connectivity, the UE 115 may desire to terminate its connection with the serving base station 205 and establish a new connection with a target base station 210. For example, as the UE 115 moves, the UE 115 may approach the limits of the coverage area 215 of the serving base station 205. At the same time, however, the UE 115 may have passed within the coverage area 220 of the target base station 210. In some examples, the UE 115 may determine a mobility parameter 235 of the UE 115. The mobility parameter 235 may indicate that the UE 115 is at a particular location, traveling in a particular direction, at a particular speed, other information related to the mobility of the UE 115, or any combination thereof. When the UE 115 approaches the limits of the coverage area 215 of the serving base station 205, a handover procedure of the UE 115 between the serving base station 205 and the target base station 210 may be initiated.

In some examples of new radio (NR), the target base station 210 may communicate with UEs 115 via directional wireless communication links 240 (sometimes referred to as directional wireless beams or directional beams). The directional wireless communication links 240 may be pointed in a specific direction and provide high-bandwidth links between the target base station 210 and the UEs 115. Signal processing techniques, such as beamforming, may be used to coherently combine energy and thereby form the directional wireless communication links 240. Wireless communication links achieved through beamforming may be associated with narrow beams (e.g., "pencil beams") that are highly directional, minimize and/or reduce inter-link interference, and provide high-bandwidth links between wireless nodes (e.g., base stations, access nodes, UEs etc.). In some examples, the target base station 210 may operate in mmW frequency ranges (e.g., 28 GHz, 40 GHz, 60 GHz, etc.). In some examples, the directional wireless communication links 240 are transmitted using frequencies greater than 6 GHz. Wireless communication at these frequencies may be associated with increased signal attenuation, for example, path loss, which may be influenced by various factors, such as temperature, barometric pressure, diffraction, etc. Dynamic beam-steering and beam-search capabilities may further support, for example, discovery, link establishment, and beam refinement in the presence of dynamic shadowing and Rayleigh fading. Additionally, communication in such mmW systems may be time division multiplexed, where a transmission may only be directed to one wireless device at a time due to the directionality of the transmitted signal.

Each directional wireless communication link 240 may have a beam width 245. The beam width 245 for each directional wireless communication link 240 may be different (e.g., compare the beam width 245-*a* of the directional wireless communication link 240-*a* to the beam width 245-*c* of the directional wireless communication link 240-*c*). The beam width 245 may related to the size of the phased array antenna used to generate the directional wireless communication link 240. Different beam widths 245 may be used by the target base station 210 in different scenarios. For example, a first message may transmitted/received using a directional wireless beam having a first beam width, while a second message may be transmitted/received using a directional wireless beam having a second beam width that is different than the first beam width. The target base station 210 may generate any number of directional wireless communication links 240 (e.g., directional wireless communication link 240-N). The directional wireless communication links 240 generated by the target base station 210 may be pointed at any geographic location.

As a UE 115 moves in the wireless communication system 200, the UE 115 may move out of the effective range of a particular directional wireless communication link (see, e.g., directional wireless communication link 240-*a*). Because of the narrow-beam width 245 of the directional wireless communication links 240, the directional wireless communication links 240 may provide coverage to a small geographic area. In contrast, an omni-directional wireless communications link radiates energy in all directions and covers a wide geographic area.

When a target base station 210 uses directional wireless communication links 240 to establish a communication link with a UE 115, it may further complicate a handover procedure. In some examples, the handover procedure discussed herein is a non-contention handover procedure. Control messages exchanged during a handover procedure may have latency between transmission and receipt. As such, there may be a delay of time between when a target base station 210 assigns resources to the UE 115 and when the UE 115 may execute an operation using those assigned resources. In some examples, the handover procedure may have a latency that spans a few tens to hundreds of milliseconds. Due to UE mobility, rotation, or signal blockage, channel characteristics of a directional wireless communication link 240 may change over time. In particular, the channel characteristics of an assigned directional wireless communication link 240 may change during the delays of the handover procedure. If a single resource (e.g., a single directional wireless communication link 240) is assigned during a handover procedure, the handover procedure may fail due to insufficient signal later in the process. Accordingly, handover procedures may be adjusted to account for multiple directional wireless beams that may be used to establish a communication link between the target base station 210 and the UE 115 during a handover procedure.

Figure 3:
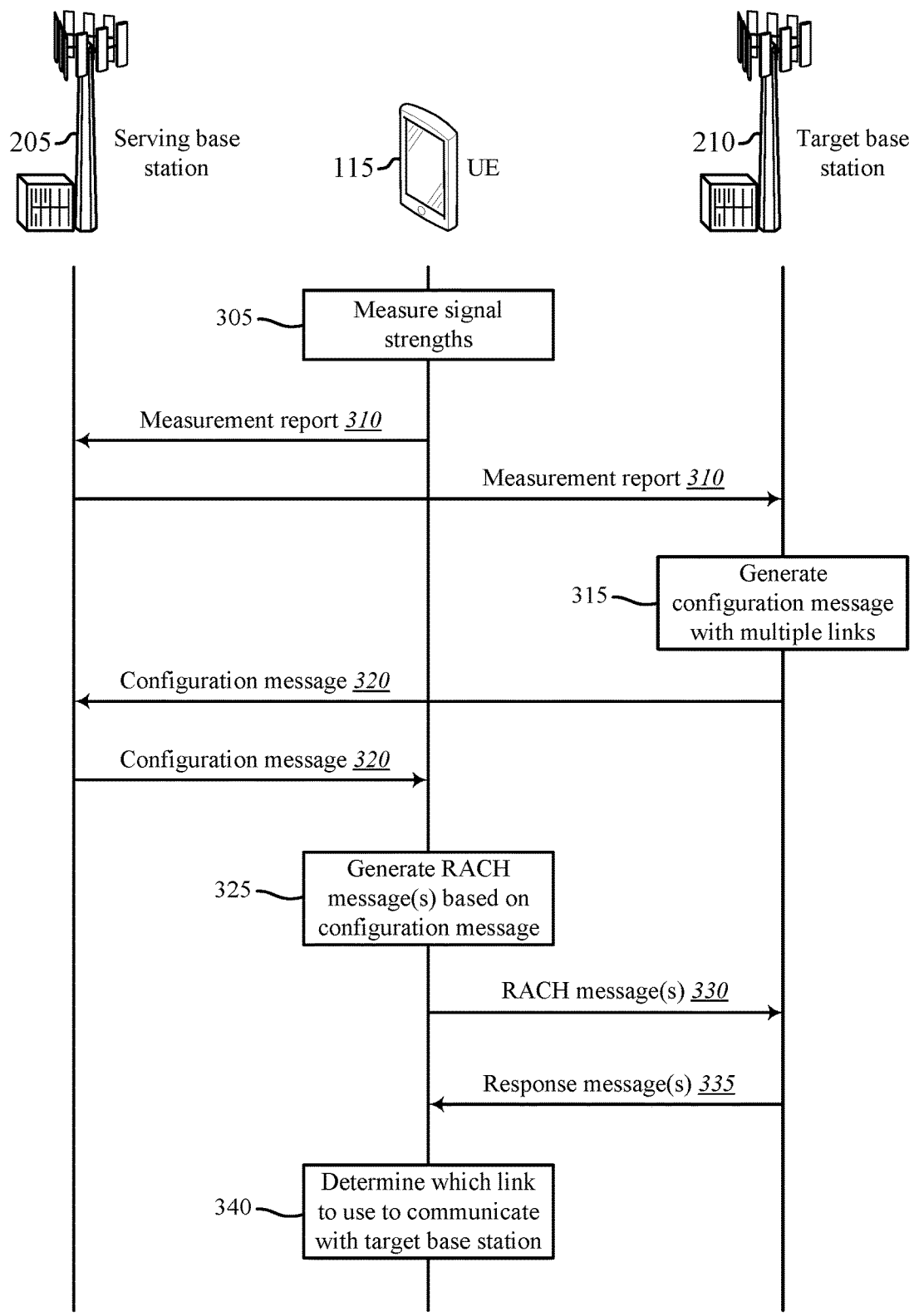
FIG. 3 illustrates an example of a communication scheme that supports techniques for handovers in the presence of directional wireless beams in accordance with aspects of the present disclosure.

FIG. 3 illustrates an example of a communication scheme 300 for techniques for handovers in the presence of directional wireless beams. The communication scheme 300 represents communications between a UE 115, the serving base station 205, and the target base station 210. The communications and procedures discussed in the communication scheme 300 may be used to execute a handover procedure when the target base station uses directional wireless communication links 240. In some examples, the handover procedure is a non-contention handover procedure.

At block 305, the UE 115 may generate a measurement report 310. The measurement report 310 may include measurements related to any number of measurement events. The measurement report 310 may indicate that a handover procedure for the UE 115 between the serving base station 205 and the target base station 210 may be executed. For example, in a LTE system, a NR system, and/or the like, a measurement report 310 may include a first report (A1) that may be triggered when the serving cell becomes better than a threshold; a second report (A2) that may be triggered when the serving cell becomes worse than a threshold; a third report (A3) that may be triggered when a neighbor cell becomes better than the primary serving cell by an offset value; a fourth report (A4) that may be triggered when a neighbor cell becomes better than a threshold; a fifth report (A5) that may be triggered when the primary serving cell becomes worse than a threshold and a neighbor cell is simultaneously better than another (e.g., higher) threshold; a sixth report (A6) that may be triggered when a neighbor cell becomes better than a secondary serving cell by an offset value; a seventh report (B1) that may be triggered when a neighbor using a different radio access technology (RAT) becomes better than a threshold; and an eighth report (B2) that may be triggered when a primary serving cell becomes worse than a threshold and the inter-RAT neighbor becomes better than another threshold.

A measurement report 310 may be transmitted from the UE 115 to the serving base station 205 and from the serving base station 205 to the target base station 210. The UE 115 may not have established a direct communication link with the target base station 205 at this point during the handover procedure. As such, the serving base station 205 may serve as a communication relay between the UE 115 and the target base station 210 during some phases of the handover procedure. In some examples, the measurement report 310 may be communicated via the communication link 230 and the backhaul link 225.

Upon receiving the measurement report 310, at block 315, the target base station 210 may generate a configuration message 320 that includes access parameters for a plurality of directional wireless communication links 240 (e.g., directional wireless beams). Generating the configuration message 320 may include determining information about the UE 115 from the measurement report 310 (e.g., the relative location of the UE to one of the base stations 205, 210), determining information about the UE 115 directly, gathering other information about the UE 115, or any combination thereof. In some examples, the directional wireless communication links included in the configuration message 320 may be selected from a total number of directional wireless communication links 240 the target base station 210 can produce. The plurality of directional wireless communication links may be selected based at least in part on network latency, network traffic, mobility parameters of the UE 115, prior radio link failures (RLFs), other information, or any combination thereof. In some examples, the serving base station 205 may identify the need for multiple directional wireless communication links to be included in the configuration message 320. In such examples, the serving base station 205 may notify the target base station 210 to provide the plurality of directional wireless communication links in the configuration message 320.

The configuration message 320 may include access parameters for each of the plurality of directional wireless communication links. The access parameters for each directional wireless communication link may include, for example, one or more of a preamble index, a physical random access channel (PRACH) mask index, a beam index, a transmission window, a response window, priority information, a power level, or any combination thereof.

Figure 4:
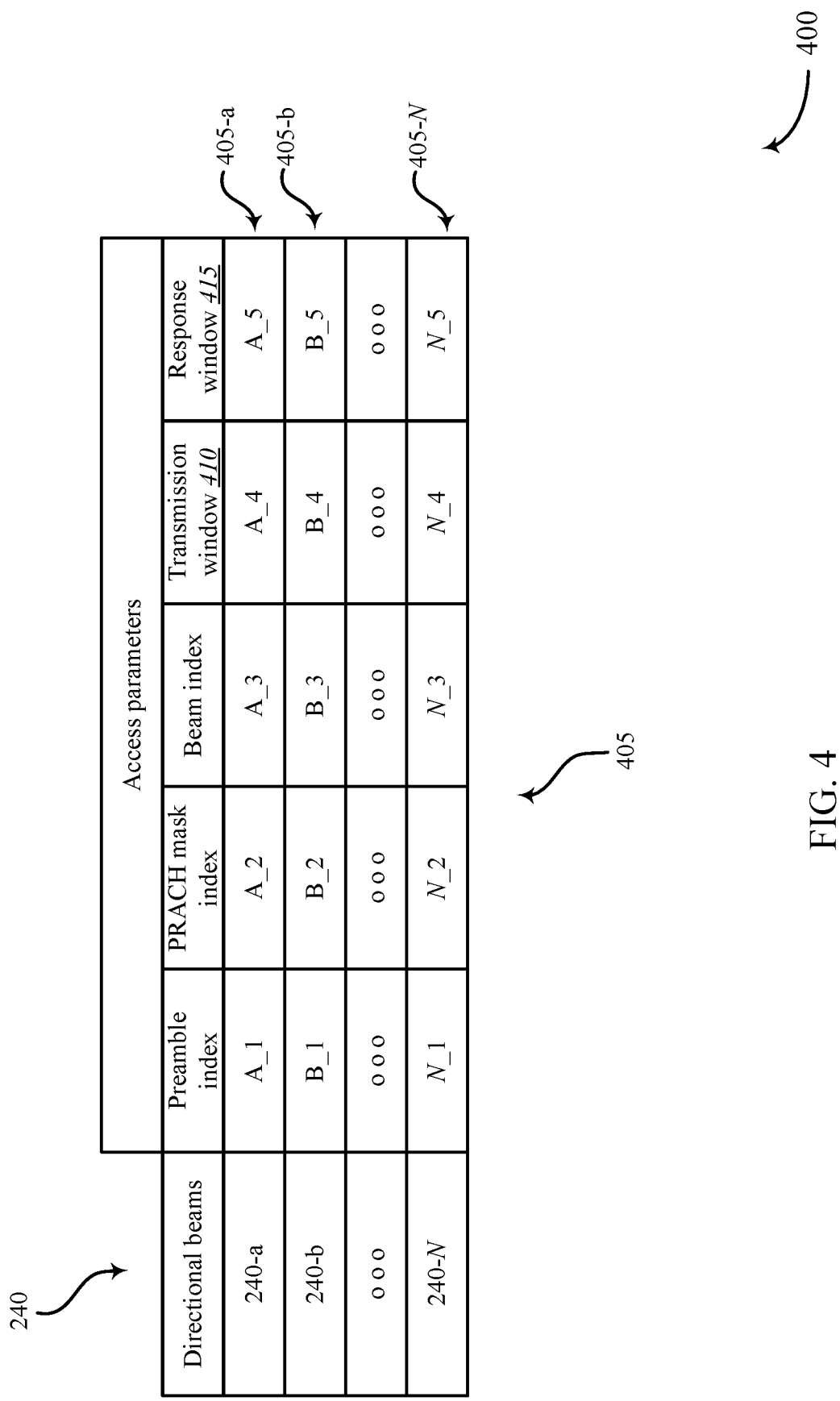
FIG. 4 illustrates an example of a table that supports techniques for handovers in the presence of directional wireless beams in accordance with aspects of the present disclosure.

FIG. 4 illustrates an example of a table 400 of access parameters 405 in a configuration message 320 for techniques for handovers in the presence of directional wireless beams. The table 400 is provided as an illustrative example only. The access parameters 405 may be organized according to other configurations or data structures. The table 400 shows directional wireless communication links 240 in the far-left column. In subsequent columns, the table 400 shows access parameters 405 associated with the directional wireless communication links 240. The configuration message 320 may include any number (e.g., N) of directional wireless communication links 240. A first subset of access parameters 405-a may be associated with a single directional wireless beam (e.g., 240-a). A second subset of access parameters 405-b may be associated with a different directional wireless beam (e.g., 240-b). As shown in table 400, the values of the access parameters 405 associated with each directional wireless beam may be unique from the other values (e.g., A_1, B_1, . . . N_1). In some examples, other categories of access parameters 405 may be included in the configuration message 320. For example, a preamble index, PRACH mask index, beam index, transmission window, response window, other parameters, or any combination thereof, as shown in table 400, may be included in the configuration message 320. The categories included in the table 400 are for illustrative purposes only.

In some examples, the configuration message 320 may be an example of a RRCConnectionReconfiguration message. In some examples, the configuration message 320 may include mobilityControlInfo. In some examples, the configuration message 320 may be an example of a mobilityControlInfo message.

In some examples, each directional wireless communication link 240 may be associated with a transmission window 410. In some handover procedures, when a dedicated preamble is used, the target base station 210 dedicates a particular duration of time to receive a RACH message from the UE 115 that is assigned the dedicated preamble. The transmission window 410 may indicate a start time of the particular duration of time, an end time of the particular duration of time, a duration of the particular duration of time, other characteristics of the particular duration of time, or any combination thereof. In some examples, the transmission window 410 may be determined by the target base station 210.

In some examples, each directional wireless communication link 240 may be associated with a response window 415. In some instances, a UE 115 may be able to monitor only one directional wireless communication link 240 at a time. To avoid missing any responses to the RACH messages, the response window 415 may indicate a dedicated duration for the UE 115 to monitor a particular directional wireless communication link 240 for responses. The response window 415 may indicate a start time, an end time, a duration, other characteristics, or any combination thereof, related to the dedicated duration. In some examples, the response window 415 may be determined by the target base station 210.

The target base station 210 may determine the response windows 415 for each directional wireless communication link 240 such that no response window 415 overlaps with another response window 415. Because the UE may be able to monitor only one directional wireless beam at a time, a dedicated time to monitor each beam is set aside as a response window 415. The access parameter 405 may include information expressing the response window 415 in time, subframes, slots, mini-slots, or any combination thereof. For example, the start time of the response window 415 may be a certain subframe. In another example, the response windows 415 designated for directional wireless communication links 240-a and 240-b, A_5 and B_5 respectively, may each be assigned a start time and end time for their respective response window 415. If window parameters A_5 designate a start time prior to the start time designated in window parameters B_5, then the end time designated in window parameters A_5 may also occur prior to the start time of B_5. Thus, no overlap in response windows 415 would occur between A_5 and B_5.

In some examples, the access parameters 405 may also include priority information associated with the plurality of directional wireless communication links 240. The priority information may indicate a ranking of the plurality of directional wireless communication links 240. For example, the priority information may indicate that a UE 115 should first attempt to communicate via the directional wireless communication link 240-a, next, the UE 115 should attempt to communication via the directional wireless communication link 240-b, and so forth. In some examples, the priority information may include other data related to the directional wireless communication links 240. In some examples, the access parameters 405 may include power levels for the transmission of RACH messages or other messages.

Returning to FIG. 3, the configuration message 320 may be transmitted from the target base station 210 to the serving base station 205. The serving base station 205 may then transmit the configuration message 320 to the UE 115. In this manner, the serving base station 205 may relay messages between the UE 115 and the target base station 210 because there may be no direct communication link between the UE 115 and the target base station 210 at this point.

Upon receiving the configuration message 320, at block 325, the UE 115 may generate a RACH message 330 based at least in part on the configuration message 320. For instance, a RACH message 330 may be generated for each directional wireless communication link included in the configuration message 320 based at least in part on the access parameters 405. For example, a RACH message 330 intended to be transmitted on the directional wireless communication link 240-a may include the preamble index or the preamble included in the access parameters 405 associated with the directional wireless communication link 240-*a* (e.g., value A_1). The UE 115 may transmit the RACH message 330 on the directional wireless communication link 240-*a* during the transmission window 410 associated with the directional wireless communication link 240-*a*.

At least one RACH message 330 may be transmitted via a directional wireless communication link 240 included in the configuration message 320. In some examples, RACH messages 330 are generated and transmitted for all directional wireless communication links 240 included in the configuration message 320.

Upon receiving a RACH message 330 from the UE 115, the target base station 210 may generate and transmit a response message 335. In some examples, if the RACH message 330 is received via the directional wireless communication link 240-*a*, the response 335 may be transmitted via the directional wireless communication link 240-*a*. In other examples, the response 335 may be transmitted on communication links other than the one on which the RACH message 330 was received (e.g., omni-directional communication links or other directional wireless communication links). In other examples, the serving base station 205 or the target base station 210 may determine a proximity of the UE 115 based at least in part on data included in the measurement report 310. At least one response 335 may be transmitted via a directional wireless communication link 240 included in the configuration message 320. In some examples, responses 335 are generated and transmitted for all directional wireless communication links 240 for which RACH messages 330 were received. The response 335 may be configured to synchronize communications between the target base station 210 and the UE 115. The response 335 may include, for example, one or more of timing alignment data, initial uplink grant(s), timing alignment data for downlink data arrival case(s), a response preamble identifier, other relevant information, or any combinations thereof.

In some instances, the UE 115 may receive multiple responses 335 via multiple directional wireless communication links 240. Upon receiving multiple responses 335, at block 340, the UE 115 may determine which one or more directional wireless communication link(s) 240 to use to communicate with the target base station 210. Once a communication link between the UE 115 and the target base station 210 has been established, the UE 115 and the target base station 210 may communicate using the information included in the relevant response 335 (e.g., timing alignment data for both uplink and downlink transmissions). In some examples, upon a successful completion of a handover procedure, the UE 115 may transmit a confirmation message to the target base station 210 and/or the serving base station 205.

In some cases, the target base station 210 may determine which directional wireless communication link 240 to use to establish a communication link with the UE 115. In some examples, the target base station 210 may determine the directional wireless communication link 240 based at least in part on PRACH data. The determination by the target base station 210 may be made after the RACH messages 330 are received from the UE 115. In some examples, the target base station 210 may transmit response messages 335 on directional wireless communication links 240 based at least in part on the determination discussed above. For example, before transmitting response messages 335, the target base station 210 may determine which one or more directional wireless communication links 240 to use and transmit response messages 335 on those directional wireless communication link(s) exclusively.

Figure 5:
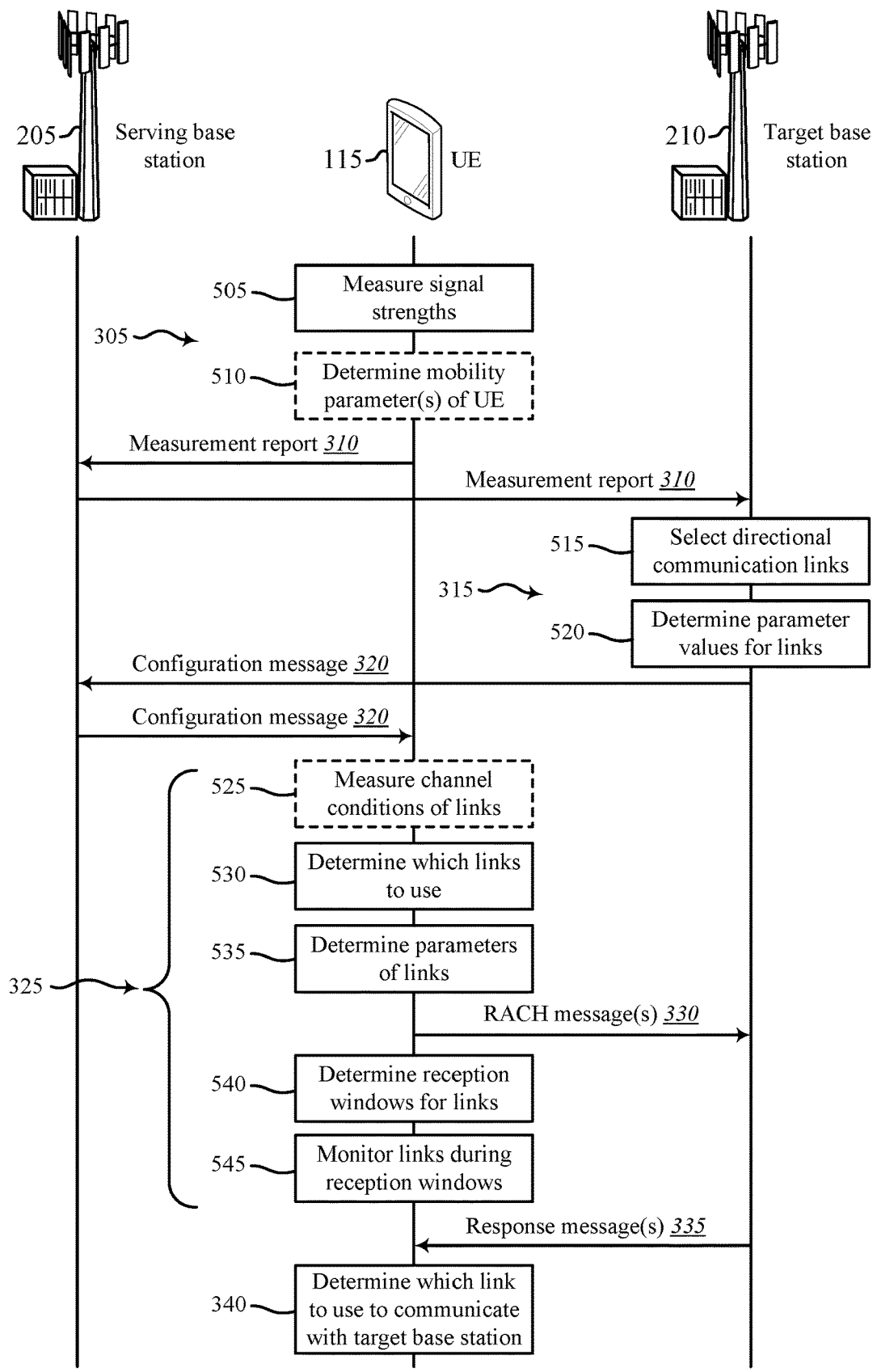
FIG. 5 illustrates an example of a communication scheme that supports techniques for handovers in the presence of directional wireless beams in accordance with aspects of the present disclosure.

FIG. 5 illustrates an example of a communication scheme 500 for techniques for handovers in the presence of directional wireless beams. The communication scheme 500 may be an example of the communication scheme 300. In some instances, the communication scheme 500 may be an expanded version of the communication scheme 300 and may contribute additional details to the communication scheme 300.

At block 505, the UE 115 may measure a signal strength of the serving base station 205 and the UE 115 may measure signal strengths of neighboring base stations (e.g., the target base station 210). The UE 115 may also compare the measured signal strengths to one or more thresholds. The UE 115 may determine whether one or more measurement events occurred based at least in part on comparing the signal strengths to the thresholds (e.g., measurements events A1, A2, A3, A4, A5, A6, B1, and/or B2). Upon determining that a measurement event has occurred, a procedure may be initiated. For example, if measurement event B2 occurs, then an inter-RAT handover procedure may be initiated (e.g., a handover from LTE to 3G). The occurrence of the measurement events or the initiation of the resultant procedures may be executed by either the UE 115 or the serving base station 205.

At block 510, the UE 115 may determine one or more mobility parameters 235 of the UE 115. The mobility parameter 235 may indicate that the UE 115 is at a particular location, traveling in a particular direction, at a particular speed, other information related to the mobility of the UE 115, or any combination thereof. In some instances, the mobility parameters may be included in the measurement report 310.

In some examples, the measurement report 310 may be generated based at least in part on a radio resource control (RRC) configuration message received by the UE 115 from the serving base station 205. The measurement reporting configuration message may include parameters related to which neighbor base stations (e.g., neighbor cells) and which frequencies the UE 115 should measure, criteria for sending measurement reports, intervals for transmission of measurement reports (i.e., measurement gaps), and other related information. In some cases, measurement reports may be triggered by events related to the channel conditions of the serving base stations or the neighbor base stations. Upon receiving the measurement report 310 from the UE 115, the serving base station 205 may determine whether a handover is needed. If the serving base station 205 determines a handover of the UE 115 is needed, the serving base station 205 may send the measurement report 310 to a target base station 210 selected from a plurality of neighboring base stations. In some examples, the measurement report 310 transmitted to the target base station 210 is different than the measurement report 310 received from the UE 115.

The measured signal strengths, the comparison to thresholds, the determining of event occurrences, the mobility parameters 235, or any combination thereof, may be included in the measurement report 310. Blocks 505 and 510 may be sub-steps or examples of block 305 described with reference to FIG. 3. As such, blocks 505 and 510 may be similarly embodied as block 305 and may include some or all of the functionalities described in relation to block 305.

The measurement report 310 may be transmitted, by the UE 115, to the serving base station 205. In some examples, the serving base station 205 may relay the measurement report 310 to the target base station 210. In other examples, if the serving base station 205 determines that a handover procedure should be initiated (e.g., an intra-RAT handover procedure), the serving base station 205 may then select the target base station 210 for the handover procedure from an assortment of neighboring base stations. In some examples, the target base station 210 may be selected based at least in part on the location of the UE 115, the mobility parameters 235 of the UE 115, or other relevant information related to the UE 115. Once the serving base station 205 selects a target base station 210, the serving base station 205 may transmit the measurement report 310 to the target base station 210. In some examples, the UE 115 may select the target base station 210. In some examples, the serving base station 205 may alter or modify the measurement report 310 before transmitting the measurement report to the target base station 210.

Upon receiving the measurement report 310, the target base station 210 may determine whether the configuration message 320 may include multiple directional wireless communication links 240. In some examples, the serving base station 205 may determine whether the configuration message 320 may include multiple directional wireless communication links 240.

At block 515, the target base station 210 may select a plurality of directional wireless communication links 240 to include in the configuration message 320. The plurality of directional wireless communication links 240 may be selected from a larger set of directional wireless communication links 240 associated with the target base station 210. In some examples, selecting the plurality of directional wireless communication links 240 may be based at least in part on network latency, network traffic, mobility parameters of the UE 115, availability of communication resources, or a combination thereof. In some examples, the plurality of directional wireless communication links 240 may be selected based at least in part on the information included in the measurement report 310. In some examples, the target base station 210 may initiate one or more measurements, messages, or other means to gather additional information about the location and the mobility of the UE 115. The plurality of directional wireless communication links 240 may be selected based at least in part on the information included in the measurement report 310 and the additional information gathered directly by the target base station 210. In some examples, the target base station 210 may select the directional wireless communication links 240 based at least in part on the distance from the UE 115 to the target base station 210 or an angle to the target base station 210. In some examples, the selected directional wireless communication links 240 may have varying beam widths 245. In some examples, the beam widths 245 of the directional wireless communication links 240 included in the configuration message 320 may be broader than the beam widths of typical directional beams used to communicate messages between the target base station 210 and a connected UE 115.

At block 520, the target base station 210 may determine access parameters for each directional wireless communication link 240 in the plurality of directional wireless communication links. Determining the access parameters 405 may include determining which types or categories of access parameters may be included in the configuration message 320 and/or determining the values of the selected access parameters 405. In some examples, determining values for the access parameters for each directional wireless communication link 240 may be based at least in part on estimated latency, network traffic, mobility parameters of the UE, availability of communication resources, or a combination thereof. The value of each access parameter 405 in the configuration message 320 may be uniquely determined for each directional wireless communication link 240 included in the configuration message 320.

Blocks 515 and 520 may be sub-steps or examples of block 315 described with reference to FIG. 3. As such, blocks 515 and 520 may be similarly embodied as block 315 and may include some or all of the functionalities described in relation to block 315.

The configuration message 320 may be transmitted by the target base station 210. The serving base station 205 may relay the configuration message 320 to the UE 115.

At block 525, the UE 115 may measure the channel conditions of the plurality of directional wireless communication links 240 included in the configuration message 320. At block 530, based at least in part on the measured channel conditions, the UE 115 may determine via which directional wireless communication links 240 to send a RACH message 330 to the target base station 210. In some examples, the UE 115 generates and transmits RACH messages 330 on all of the directional wireless communication links 240 included in the configuration message 320. In other examples, the UE 115 generates and transmits RACH messages 330 on a subset of the directional wireless communication links 240 included in the configuration message 320.

At block 535, the UE 115 may determine the access parameters 405 for each directional wireless communication link 240 included in the configuration message 320. In some examples, the UE 115 may determine the access parameters for the selected subset of directional wireless communication links 240. The access parameters 405 that may be determined by the UE 115 may include the preamble index, the PRACH mask index, the beam index, the transmission window, the reception window, the priority information, power levels, or any combination thereof.

The RACH messages 330 may be transmitted to the target base station 210 via one or more of the directional wireless communication links 240 included in the configuration message 320. The RACH message 330 for each directional wireless communication link 240 may be transmitted during its associated transmission window indicated in the configuration message 320.

At block 540, the UE 115 may determine the reception windows for each directional wireless communication link 240 included in the configuration message 320. In some instances, the UE 115 may be able to monitor one directional wireless beam at a time. This may be due to analog beamforming constraints. As such, any given reception window may not overlap with any other reception window. For example, the timing parameters may follow the example given above with respect to the response windows 415 of FIG. 4. To avoid overlap, the target base station 210 may determine reception windows in a centralized manner.

At block 545, the UE 115 may monitor individual directional wireless communication links 240 during their respective reception windows. While monitoring, the UE 115 may be looking for a response message 335 sent by the target base station 210. The target base station 210 may generate and/or transmit the response messages 335 based at least in part on receiving a related RACH message 330 from the UE 115. The UE 115 may continue to monitor recurring times of transmission windows if the expected response messages 335 are not received. In some examples, the target base station 210 may reclaim RACH resources on completion of the handover procedure, after a timer associated with each resource has expired, or both. For example, the target base station 210 may reclaim RACH transmission windows if a RACH message 330 is not received before the expiration of a timer associated with RACH transmission windows. In another example, the UE 115 may be stationary (as possibly indicated by a mobility parameter 235). In such a scenario, the UE 115 may not RACH on all directional wireless communication links 240 included in the configuration message 320. As such, the target base station 210 may reclaim the RACH resources not used after a certain amount of time has expired.

Blocks 525, 530, 535, 540, and 545 may be sub-steps or examples of block 325 described with reference to FIG. 3. As such, blocks 525, 530, 535, 540, and 545 may be similarly embodied as block 325 and may include some or all of the functionalities described in relation to block 325.

In some instances, the UE 115 may receive one or multiple responses 335 via one or multiple directional wireless communication links 240. Upon receiving one or multiple responses 335, at block 340 of FIG. 5, the UE 115 may determine which one or more directional wireless communication link(s) 240 to use to communicate with the target base station 210. Once a communication link between the UE 115 and the target base station 210 has been established, the UE 115 and the target base station 210 may communicate using the information included in the relevant response 335 (e.g., timing alignment data for both uplink and downlink transmissions).

In some cases, the target base station 210 may determine which directional wireless communication link 240 to use to establish a communication link with the UE 115. In some examples, the target base station 210 may determine the directional wireless communication link 240 based at least in part on PRACH data. The determination by the target base station 210 may be made after the RACH message(s) 330 (see FIG. 5) are received from the UE 115. In some examples, the target base station 210 may transmit response message(s) 335 on directional wireless communication links 240 based at least in part on the determination discussed above. For example, before transmitting response message(s) 335 (see FIG. 5), the target base station 210 may determine which one or more directional wireless communication links 240 to use and transmit response message(s) 335 on those directional wireless communication link(s) exclusively.

Figure 6:
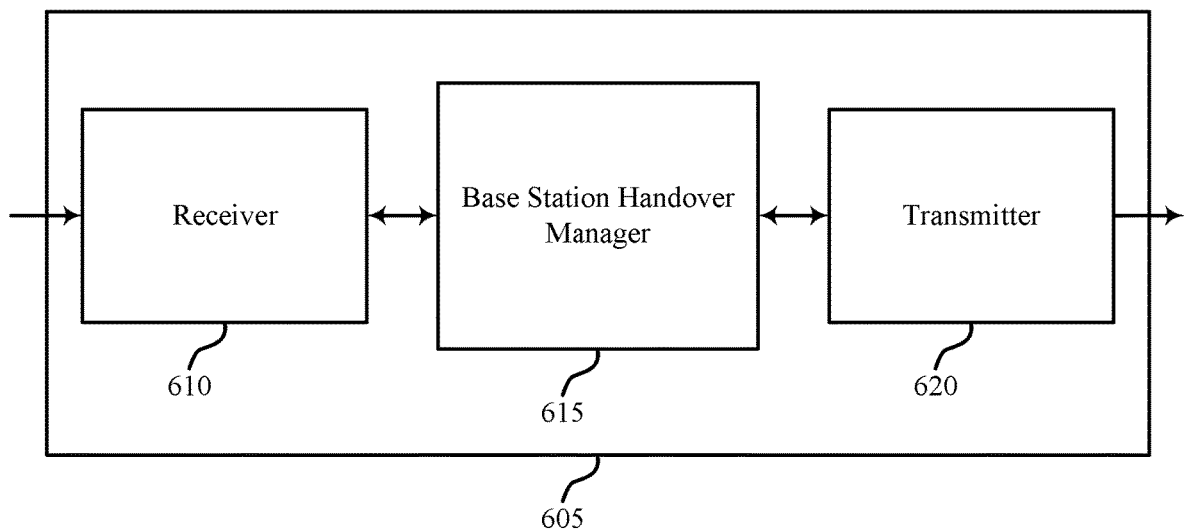
FIGS. 6 through 8 show block diagrams of a device that supports techniques for handovers in the presence of directional wireless beams in accordance with aspects of the present disclosure.

FIG. 6 shows a block diagram 600 of a wireless device 605 that supports techniques for handovers in the presence of directional wireless beams in accordance with various aspects of the present disclosure. Wireless device 605 may be an example of aspects of base stations 105, 205, 210 as described with reference to FIGS. 1-3 and 5. In some examples, the wireless device may be a target base station. Wireless device 605 may include receiver 610, base station handover manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to techniques for handovers in the presence of directional wireless beams, etc.). Information may be passed on to other components of the device. The receiver 610 may be an example of aspects of the transceiver 935 described with reference to FIG. 9.

Base station handover manager 615 may be an example of aspects of the base station handover manager 915 described with reference to FIG. 9.

Base station handover manager 615 may receive a measurement report, generate, based on the measurement report, a first message including access parameters for each of a set of directional wireless communication links between the UE and a target base station, and transmit the first message to the UE via a serving base station.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or the transmitter 620 may include a set of antennas.

Figure 7:
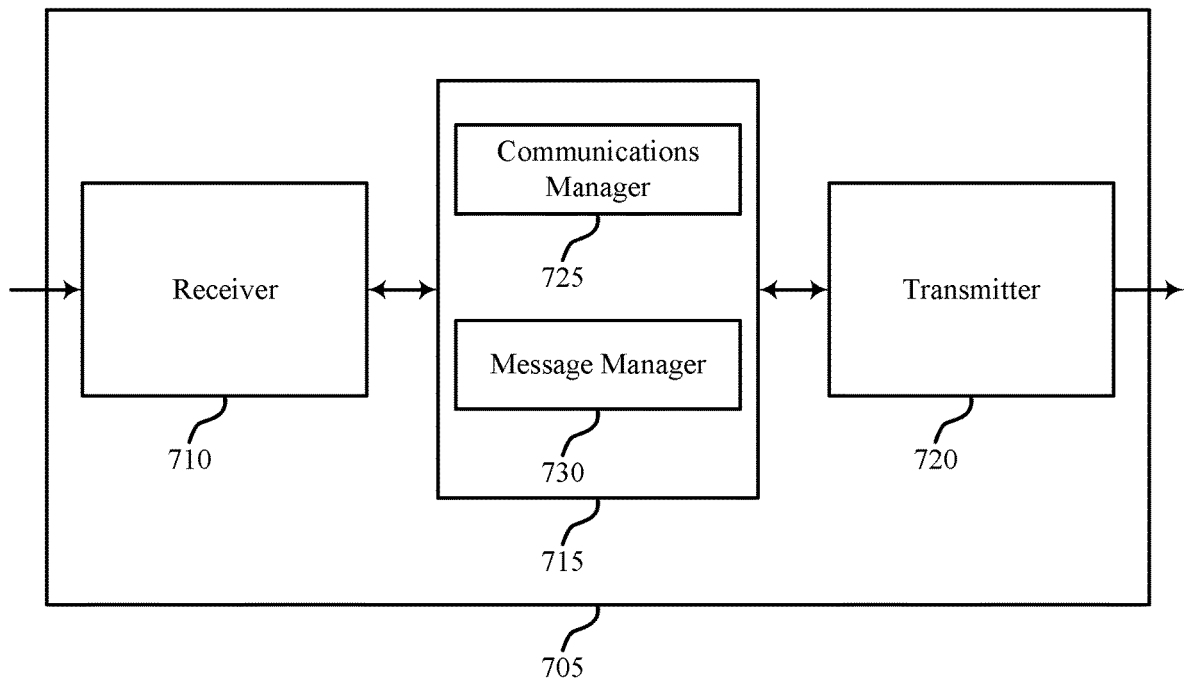

FIG. 7 shows a block diagram 700 of a wireless device 705 that supports techniques for handovers in the presence of directional wireless beams in accordance with various aspects of the present disclosure. Wireless device 705 may be an example of aspects of a wireless device 605 or base stations 105, 205, 210 as described with reference to FIGS. 1-3 and 5-6. Wireless device 705 may include receiver 710, base station handover manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to techniques for handovers in the presence of directional wireless beams, etc.). Information may be passed on to other components of the device. The receiver 710 may be an example of aspects of the transceiver 935 described with reference to FIG. 9.

Base station handover manager 715 may be an example of aspects of the base station handover manager 915 described with reference to FIG. 9. Base station handover manager 715 may also include communications manager 725 and message manager 730.

Communications manager 725 may receive a measurement report, transmit a first message to a UE via a serving base station, and establish a communication link with the UE using at least one of the directional wireless communication links included in the first message. In some cases, communications manager 725 may receive a second message from the UE via one of the directional wireless communication links included in the first message based on the access parameters included in the first message, and transmit a response to the second message via the one of the directional wireless communication links included in the first message. In some cases, communications manager 725 may receive a second message via each of the directional wireless communication links included in the first message, and transmit a response via each of the directional wireless communication links included in the first message. In some cases, the measurement report and the first message are relayed between the UE and the target base station by the serving base station.

Message manager 730 may generate, by a target base station based on the measurement report, a first message including access parameters for each of a set of directional wireless communication links between the UE and the target base station. In some cases, the second message is a RACH message.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or the transmitter 720 may include a set of antennas.

Figure 8:
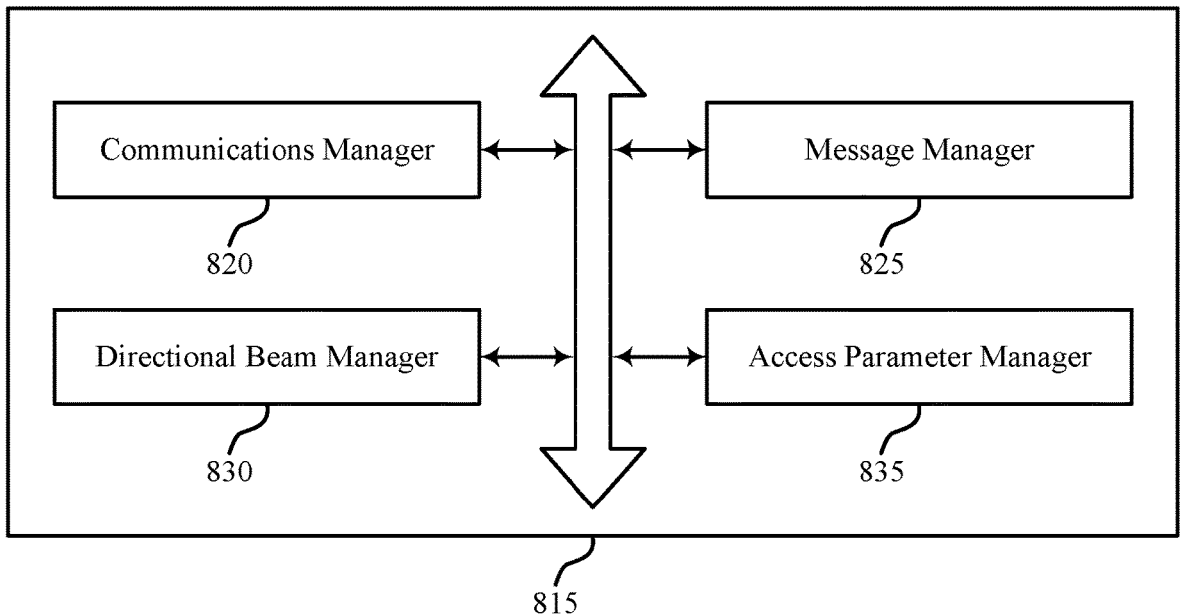

FIG. 8 shows a block diagram 800 of a base station handover manager 815 that supports techniques for handovers in the presence of directional wireless beams in accordance with various aspects of the present disclosure. The base station handover manager 815 may be an example of aspects of a base station handover manager 615, a base station handover manager 715, or a base station handover manager 915 described with reference to FIGS. 6, 7, and 9. The base station handover manager 815 may include communications manager 820, message manager 825, directional beam manager 830, and access parameter manager 835. Each of these modules may communicate, directly or indirectly, with one another (e.g., via one or more buses).

Communications manager 820 may receive a measurement report, transmit a first message to a UE via a serving base station, establish a communication link with the UE using at least one of the directional wireless communication links included in the first message. In some cases, communications manager 820 may receive a second message from the UE via one of the directional wireless communication links included in the first message based on the access parameters included in the first message, and transmit a response to the second message via the one of the directional wireless communication links included in the first message. In some cases, communications manager 820 may receive a second message via each of the directional wireless communication links included in the first message, and transmit a response via each of the directional wireless communication links included in the first message. In some cases, the measurement report and the first message are relayed between the UE and the target base station by the serving base station.

Message manager 825 may generate, by the target base station based on the measurement report, a first message including access parameters for each of a set of directional wireless communication links between the UE and the target base station. In some cases, the second message is a RACH message.

Directional beam manager 830 may select a set of directional wireless communication links to include in the first message from a total number of directional wireless communication links associated with the target base station. In some cases, the set of directional wireless communication links are mmW communication links.

Access parameter manager 835 may determine values for access parameters for each directional wireless communication link based on estimated latency, network traffic, mobility parameters of the UE, availability of communication resources, or a combination thereof. In some cases, the access parameters include a preamble index, a PRACH mask index, or a beam index for each directional wireless communication link included in the first message. In some cases, the access parameters include a response window for each directional wireless communication link included in the first message, the response window including a start time and a duration for the UE to monitor the directional wireless communication link associated with the response window. In some cases, the response window associated with one of the directional wireless communication links does not overlap with response windows associated with other directional wireless communication links. In some cases, the access parameters include a transmission window for each directional wireless communication link included in the first message, the transmission window being indicative of a dedicated time period to receive a second message from the UE via a specific directional wireless communication link of the set of directional wireless communication links. In some cases, the access parameters include priority information associated with the set of directional wireless communication links, the priority information being indicative of a ranking of the set of directional wireless communication links.

Figure 9:
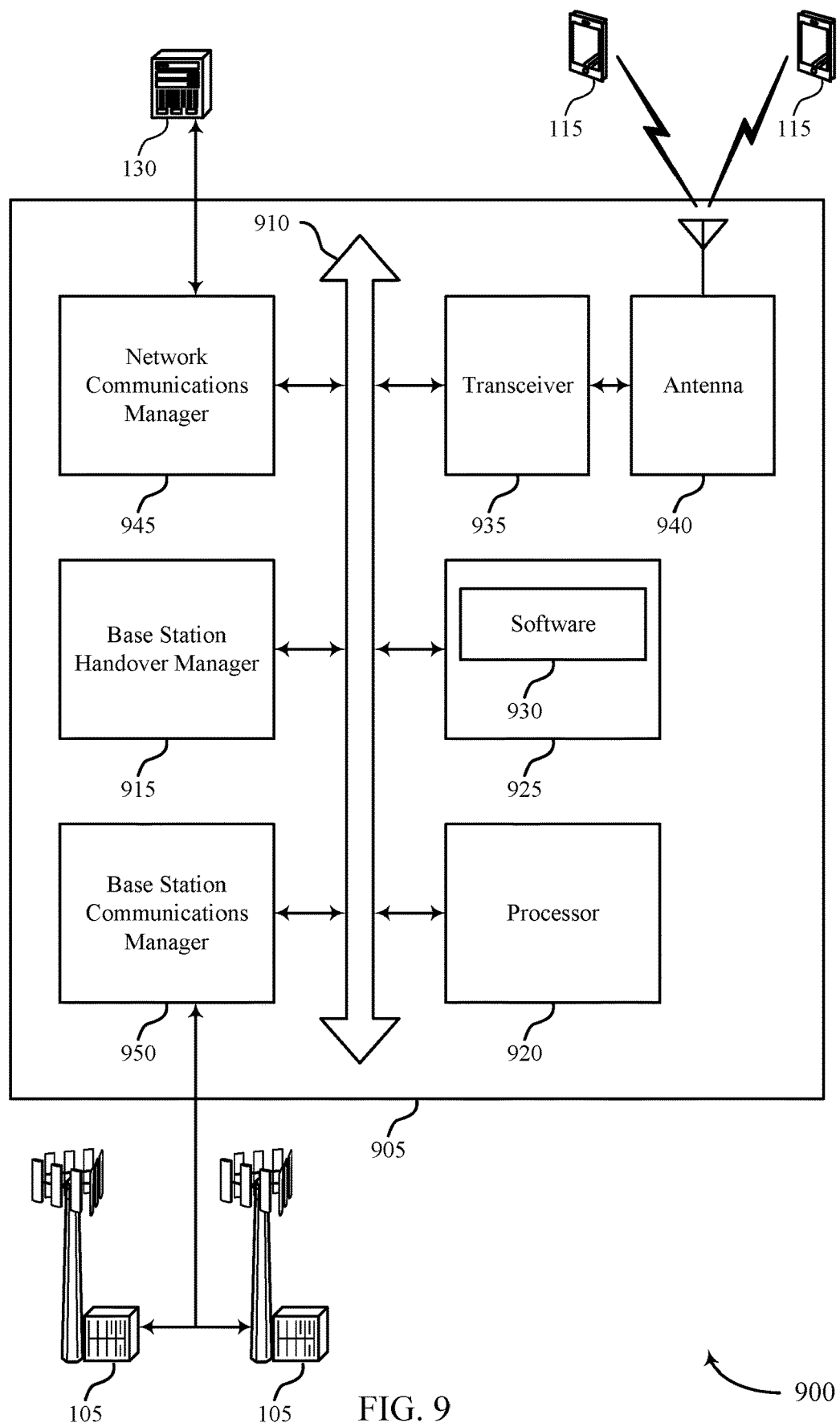
FIG. 9 illustrates a block diagram of a system including a base station that supports techniques for handovers in the presence of directional wireless beams in accordance with aspects of the present disclosure.

FIG. 9 shows a diagram of a system 900 including a device 905 that supports techniques for handovers in the presence of directional wireless beams in accordance with various aspects of the present disclosure. Device 905 may be an example of or include the components of wireless device 605, wireless device 705, or a base station 105, 205, 210 as described above, for example, with reference to FIGS. 1-3 and 5-7. In some examples, the wireless device 905 may be a target base station. Device 905 may include components for bi-directional voice and data communications including components for transmitting and receiving communications, including base station handover manager 915, processor 920, memory 925, software 930, transceiver 935, antenna 940, network communications manager 945, and base station communications manager 950. These components may be in electronic communication via one or more busses (e.g., bus 910). Device 905 may communicate wirelessly with one or more UEs 115.

Base station handover manager 915 may be an example of aspects of a base station handover manager 615, a base station handover manager 715, or a base station handover manager 815 described with reference to FIGS. 6, 7, and 8. Base station handover manager 915 may receive a measurement report, generate, based on the measurement report, a first message including access parameters for each of a set of directional wireless communication links between the UE and a target base station, and transmit the first message to the UE via a serving base station.

Processor 920 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting techniques for handovers in the presence of directional wireless beams).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support techniques for handovers in the presence of directional wireless beams. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Base station communications manager 950 may manage communications with other base station 105, and may include a controller or scheduler for controlling communications with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within a Long Term Evolution (LTE)/LTE-A wireless communication network technology to provide communication between base stations 105.

Figure 10:
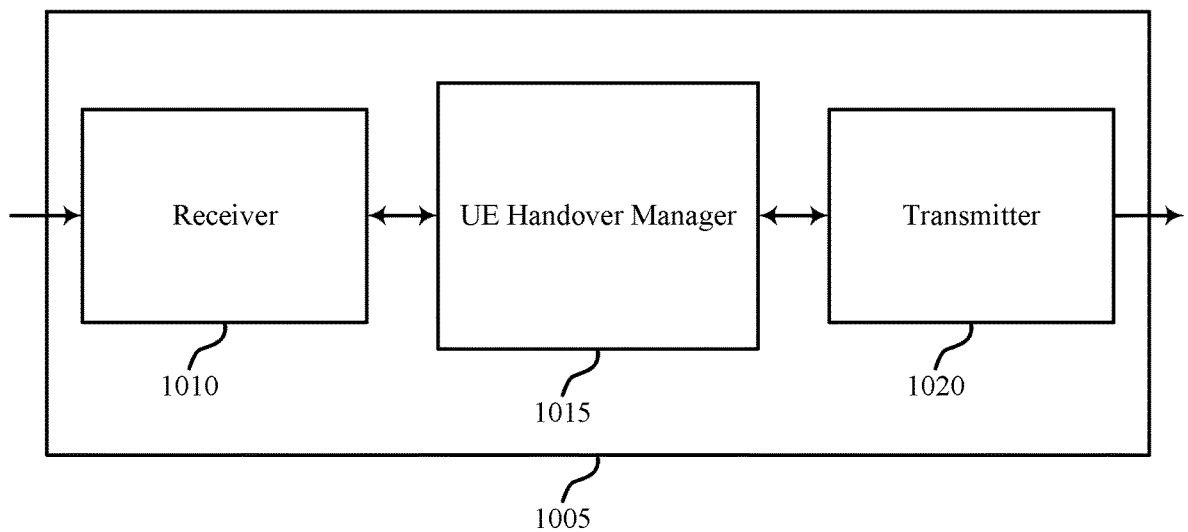
FIGS. 10 through 12 show block diagrams of a device that supports techniques for handovers in the presence of directional wireless beams in accordance with aspects of the present disclosure.

FIG. 10 shows a block diagram 1000 of a wireless device 1005 that supports techniques for handovers in the presence of directional wireless beams in accordance with various aspects of the present disclosure. Wireless device 1005 may be an example of aspects of a UE 115 as described with reference to FIGS. 1 and 2. Wireless device 1005 may include receiver 1010, UE handover manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to techniques for handovers in the presence of directional wireless beams, etc.). Information may be passed on to other components of the device. The receiver 1010 may be an example of aspects of the transceiver 1335 described with reference to FIG. 13.

UE handover manager 1015 may be an example of aspects of the UE handover manager 1315 described with reference to FIG. 13.

UE handover manager 1015 may transmit a measurement report, receive, at a UE, a first message including access parameters for each of a set of directional wireless communication links between the UE and a target base station, the first message being based on the measurement report, and transmit a second message via at least one of the directional wireless communication links based on the access parameters included in the first message.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or the transmitter 1020 may include a set of antennas.

Figure 11:
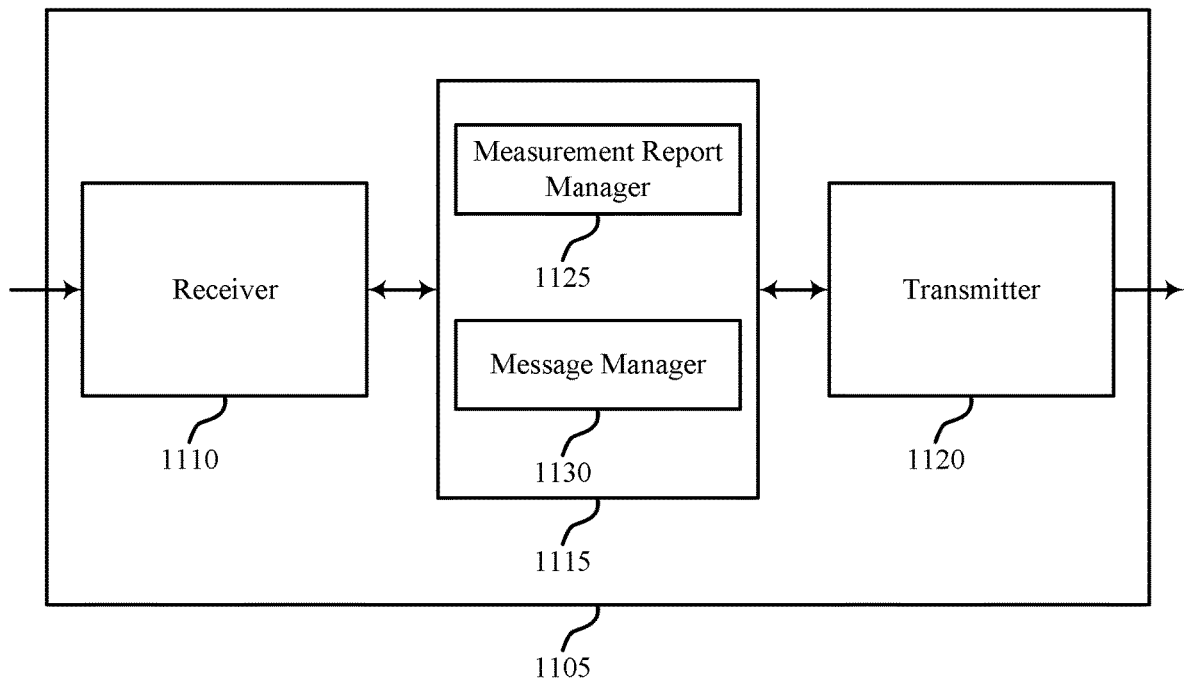

FIG. 11 shows a block diagram 1100 of a wireless device 1105 that supports techniques for handovers in the presence of directional wireless beams in accordance with various aspects of the present disclosure. Wireless device 1105 may be an example of aspects of a wireless device 1005 or a UE 115 as described with reference to FIGS. 1, 2, and 10. Wireless device 1105 may include receiver 1110, UE handover manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to techniques for handovers in the presence of directional wireless beams, etc.). Information may be passed on to other components of the device. The receiver 1110 may be an example of aspects of the transceiver 1335 described with reference to FIG. 13.

UE handover manager 1115 may be an example of aspects of the UE handover manager 1315 described with reference to FIG. 13. UE handover manager 1115 may also include measurement report manager 1125 and message manager 1130.

Measurement report manager 1125 may transmit a measurement report, measure a first signal strength of a serving base station and a second signal strength of a target base station. In some cases, measurement report manager 1125 may generate the measurement report based on the first signal strength and the second signal strength, and may generate the measurement report that includes the mobility state of the UE.

Message manager 1130 may receive, at the UE, a first message including access parameters for each of a set of directional wireless communication links between the UE and the target base station, the first message being based on the measurement report. Message manager 1130 may transmit a second message via at least one of the directional wireless communication links based on the access parameters included in the first message. In some cases, the second message is a RACH message.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or the transmitter 1120 may include a set of antennas.

Figure 12:
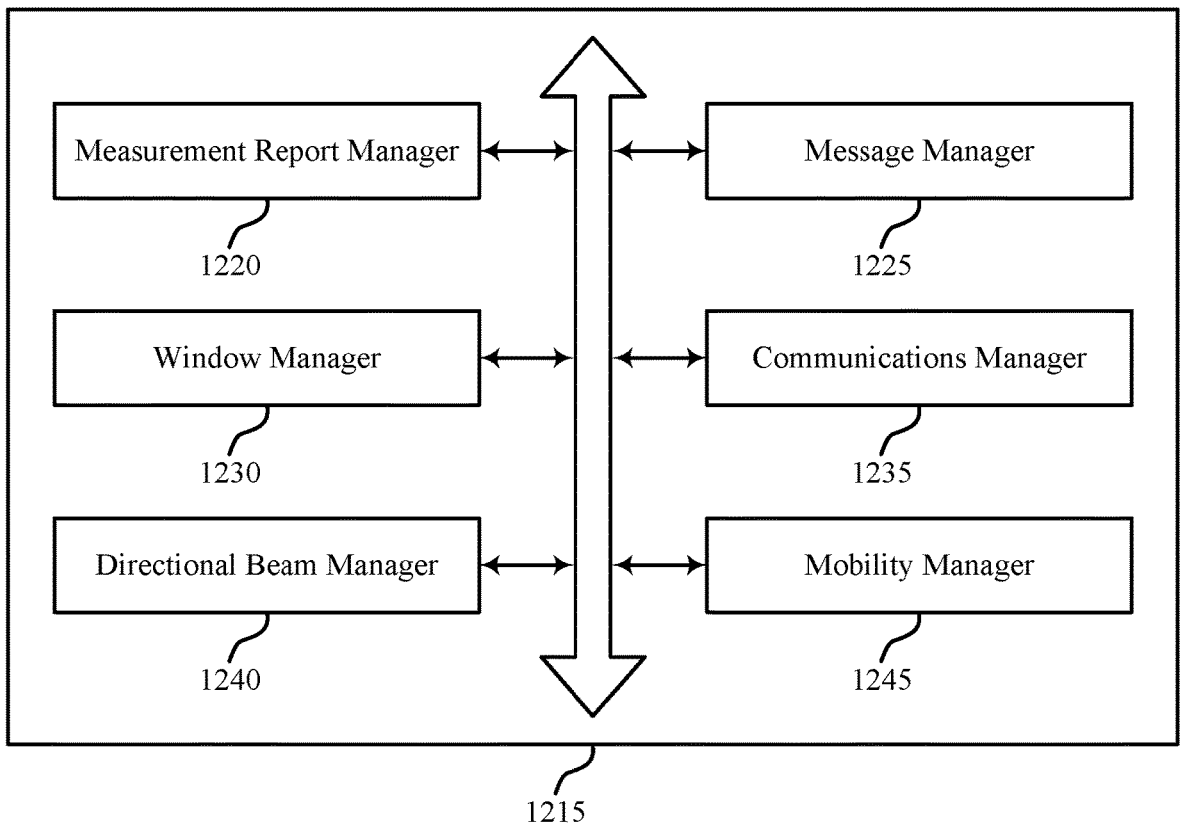

FIG. 12 shows a block diagram 1200 of a UE handover manager 1215 that supports techniques for handovers in the presence of directional wireless beams in accordance with various aspects of the present disclosure. The UE handover manager 1215 may be an example of aspects of a UE handover manager 1315 described with reference to FIGS. 10, 11, and 13. The UE handover manager 1215 may include measurement report manager 1220, message manager 1225, window manager 1230, communications manager 1235, directional beam manager 1240, and mobility manager 1245. Each of these modules may communicate, directly or indirectly, with one another (e.g., via one or more buses).

Measurement report manager 1220 may transmit a measurement report, measure a first signal strength of a serving base station and a second signal strength of a target base station. In some cases, measurement report manager 1220 may generate the measurement report based on the first signal strength and the second signal strength, and may generate the measurement report that includes the mobility state of a UE.

Message manager 1225 may receive, at the UE, a first message including access parameters for each of a set of directional wireless communication links between the UE and the target base station, the first message being based on the measurement report. Message manager 1225 may transmit a second message via at least one of the directional wireless communication links based on the access parameters included in the first message. In some cases, the second message is a RACH message.

Window manager 1230 may determine a response window for each directional wireless communication link based on the access parameters included in the first message and monitor a selected directional wireless communication link during the response window for a response to the second message, the response window being associated with the selected directional wireless communication link. In some cases, the response window associated with one of the directional wireless communication links does not overlap with response windows associated with any other directional wireless communication links.

Communications manager 1235 may receive a response to the second message via a selected directional wireless communication link of the set of directional wireless communication links during a response window associated with the selected directional wireless communication link.

Directional beam manager 1240 may select one or more directional wireless communication links of the set of directional wireless communication links based on channel conditions measured by the UE of the directional wireless communication links.

Mobility manager 1245 may determine a mobility state of the UE.

Figure 13:
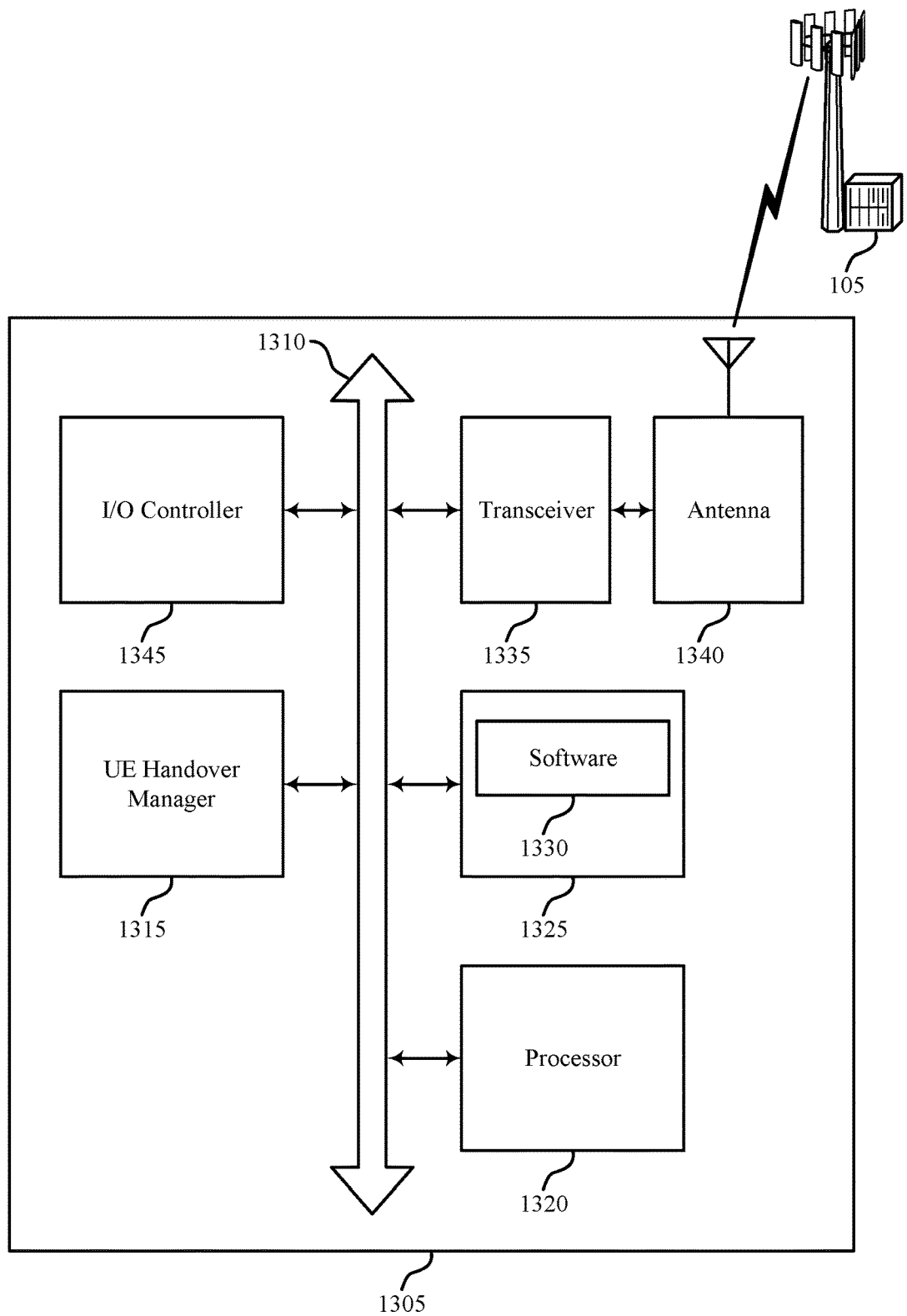
FIG. 13 illustrates a block diagram of a system including a UE that supports techniques for handovers in the presence of directional wireless beams in accordance with aspects of the present disclosure.

FIG. 13 shows a diagram of a system 1300 including a device 1305 that supports techniques for handovers in the presence of directional wireless beams in accordance with various aspects of the present disclosure. Device 1305 may be an example of or include the components of UE 115 as described above, for example, with reference to FIGS. 1 and 2. Device 1305 may include components for bi-directional voice and data communications including components for transmitting and receiving communications, including UE handover manager 1315, processor 1320, memory 1325, software 1330, transceiver 1335, antenna 1340, and I/O controller 1345. These components may be in electronic communication via one or more busses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting techniques for handovers in the presence of directional wireless beams).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support techniques for handovers in the presence of directional wireless beams. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
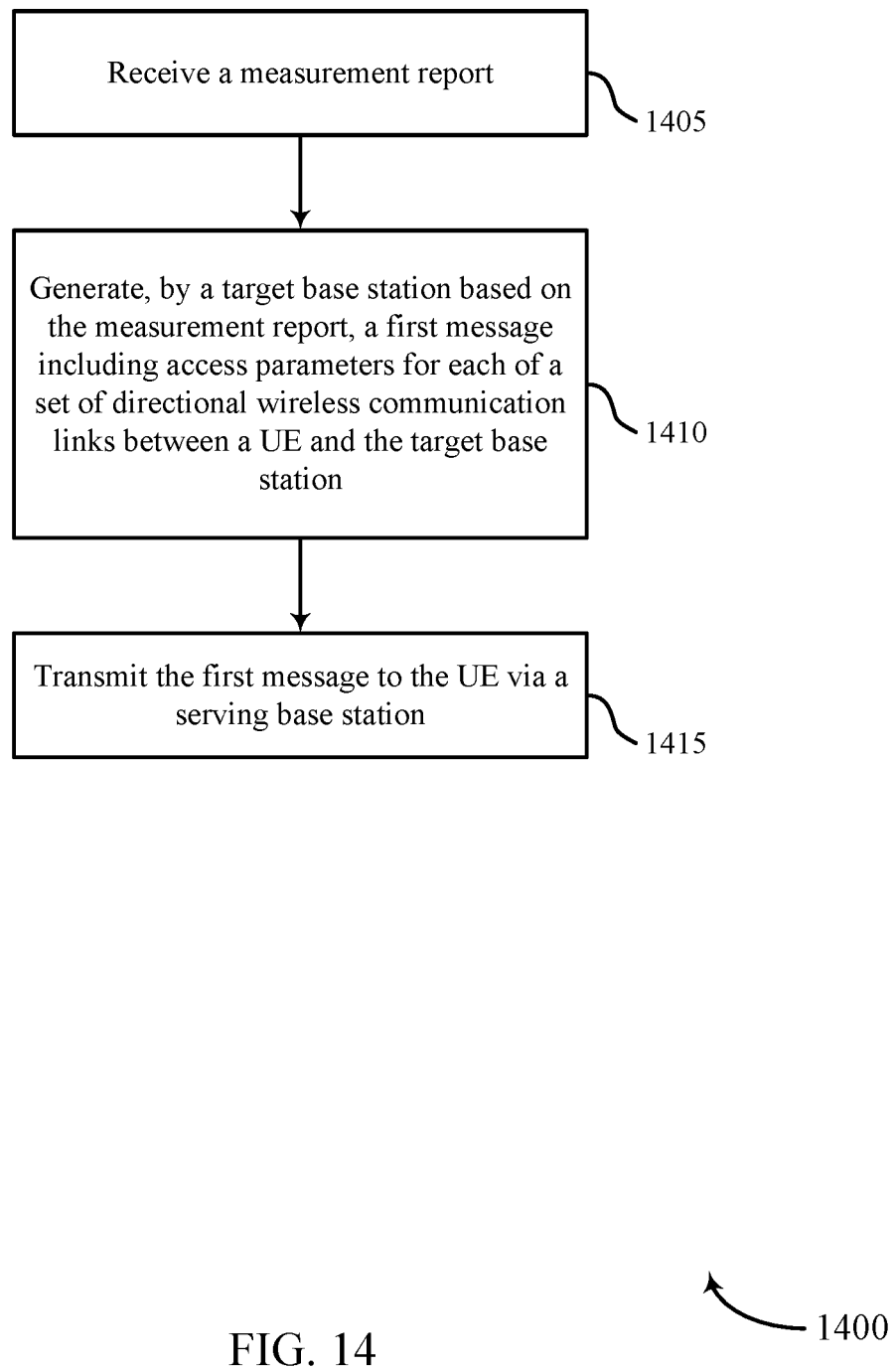
FIGS. 14 through 17 illustrate methods for techniques for handovers in the presence of directional wireless beams in accordance with aspects of the present disclosure.

FIG. 14 shows a flowchart illustrating a method 1400 for techniques for handovers in the presence of directional wireless beams in accordance with various aspects of the present disclosure. The operations of method 1400 may be implemented by a target base station 105 or its components as described herein. For example, the operations of method 1400 may be performed by a base station handover manager as described with reference to FIGS. 6 through 9. In some examples, a base station 105 may execute a set of codes to control the functional elements of the device to perform the functions described below. Additionally or alternatively, the base station 105 may perform aspects the functions described below using special-purpose hardware.

At block 1405 a target base station 105 may receive a measurement report. The operations of block 1405 may be performed according to the methods described with reference to FIGS. 1 through 5. In certain examples, aspects of the operations of block 1405 may be performed by a communications manager as described with reference to FIGS. 6 through 9.

At block 1410 the target base station 105 may generate, based at least in part on the measurement report, a first message comprising access parameters for each of a plurality of directional wireless communication links between the UE and the target base station. The operations of block 1410 may be performed according to the methods described with reference to FIGS. 1 through 5. In certain examples, aspects of the operations of block 1410 may be performed by a message manager as described with reference to FIGS. 6 through 9.

At block 1415 the target base station 105 may transmit the first message to the UE via a serving base station. The operations of block 1415 may be performed according to the methods described with reference to FIGS. 1 through 5. In certain examples, aspects of the operations of block 1415 may be performed by a communications manager as described with reference to FIGS. 6 through 9.

Figure 15:
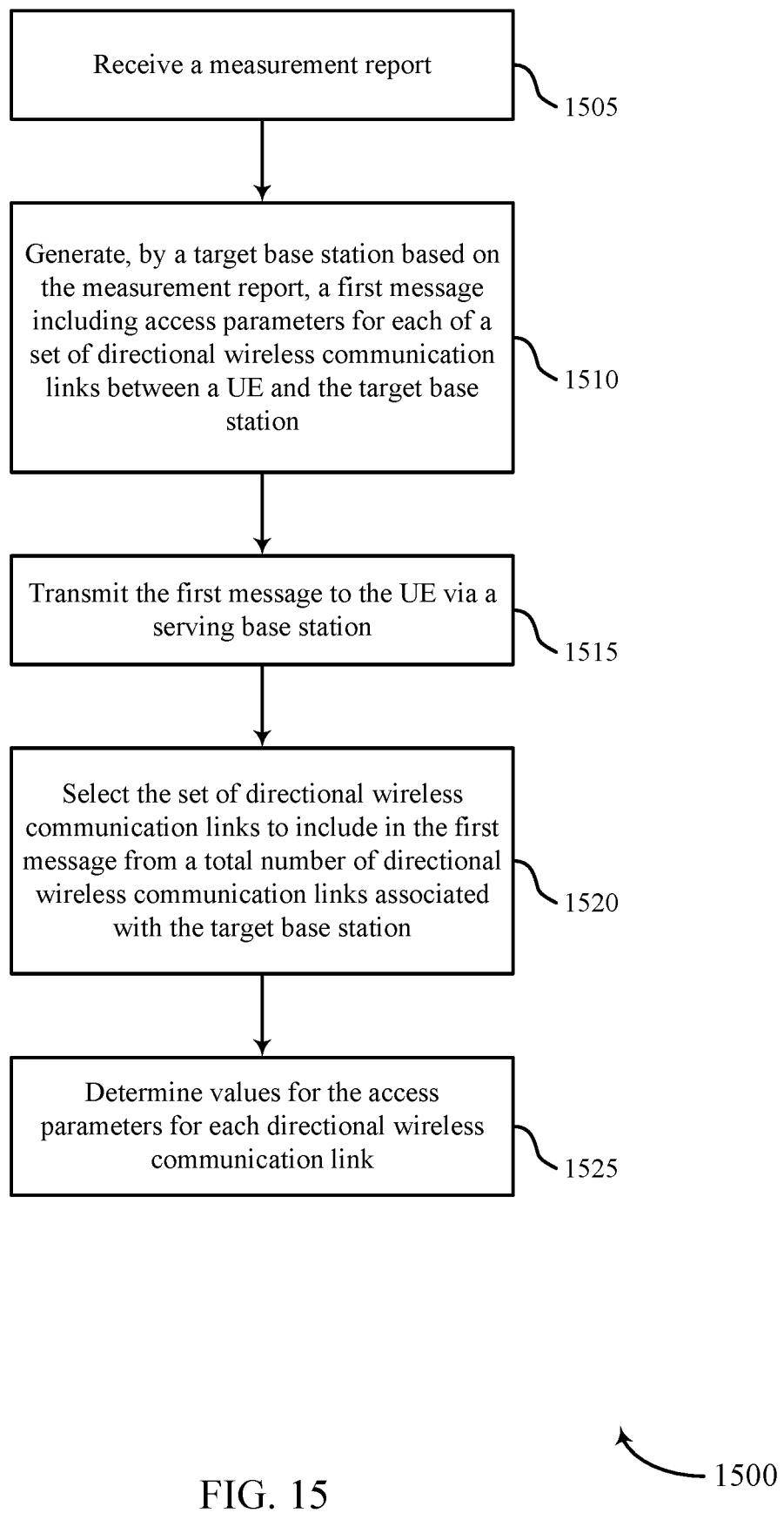

FIG. 15 shows a flowchart illustrating a method 1500 for techniques for handovers in the presence of directional wireless beams in accordance with various aspects of the present disclosure. The operations of method 1500 may be implemented by a target base station 105 or its components as described herein. For example, the operations of method 1500 may be performed by a base station handover manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1505 the target base station 105 may receive a measurement report. The operations of block 1505 may be performed according to the methods described with reference to FIGS. 1 through 5. In certain examples, aspects of the operations of block 1505 may be performed by a communications manager as described with reference to FIGS. 6 through 9.

At block 1510 the target base station 105 may generate, based at least in part on the measurement report, a first message comprising access parameters for each of a plurality of directional wireless communication links between the UE and the target base station. The operations of block 1510 may be performed according to the methods described with reference to FIGS. 1 through 5. In certain examples, aspects of the operations of block 1510 may be performed by a message manager as described with reference to FIGS. 6 through 9.

At block 1515 the target base station 105 may transmit the first message to the UE via a serving base station. The operations of block 1515 may be performed according to the methods described with reference to FIGS. 1 through 5. In certain examples, aspects of the operations of block 1515 may be performed by a communications manager as described with reference to FIGS. 6 through 9.

At block 1520 the target base station 105 may select the plurality of directional wireless communication links to include in the first message from a total number of directional wireless communication links associated with the target base station. The operations of block 1520 may be performed according to the methods described with reference to FIGS. 1 through 5. In certain examples, aspects of the operations of block 1520 may be performed by a directional beam manager as described with reference to FIGS. 6 through 9.

At block 1525 the target base station 105 may determine values for the access parameters for each directional wireless communication link. In some examples, target base station 105 may determine values for the access parameters based at least in part on estimated latency, network traffic, mobility parameters of the UE, availability of communication resources, or a combination thereof. The operations of block 1525 may be performed according to the methods described with reference to FIGS. 1 through 5. In certain examples, aspects of the operations of block 1525 may be performed by an access parameter manager as described with reference to FIGS. 6 through 9.

Figure 16:
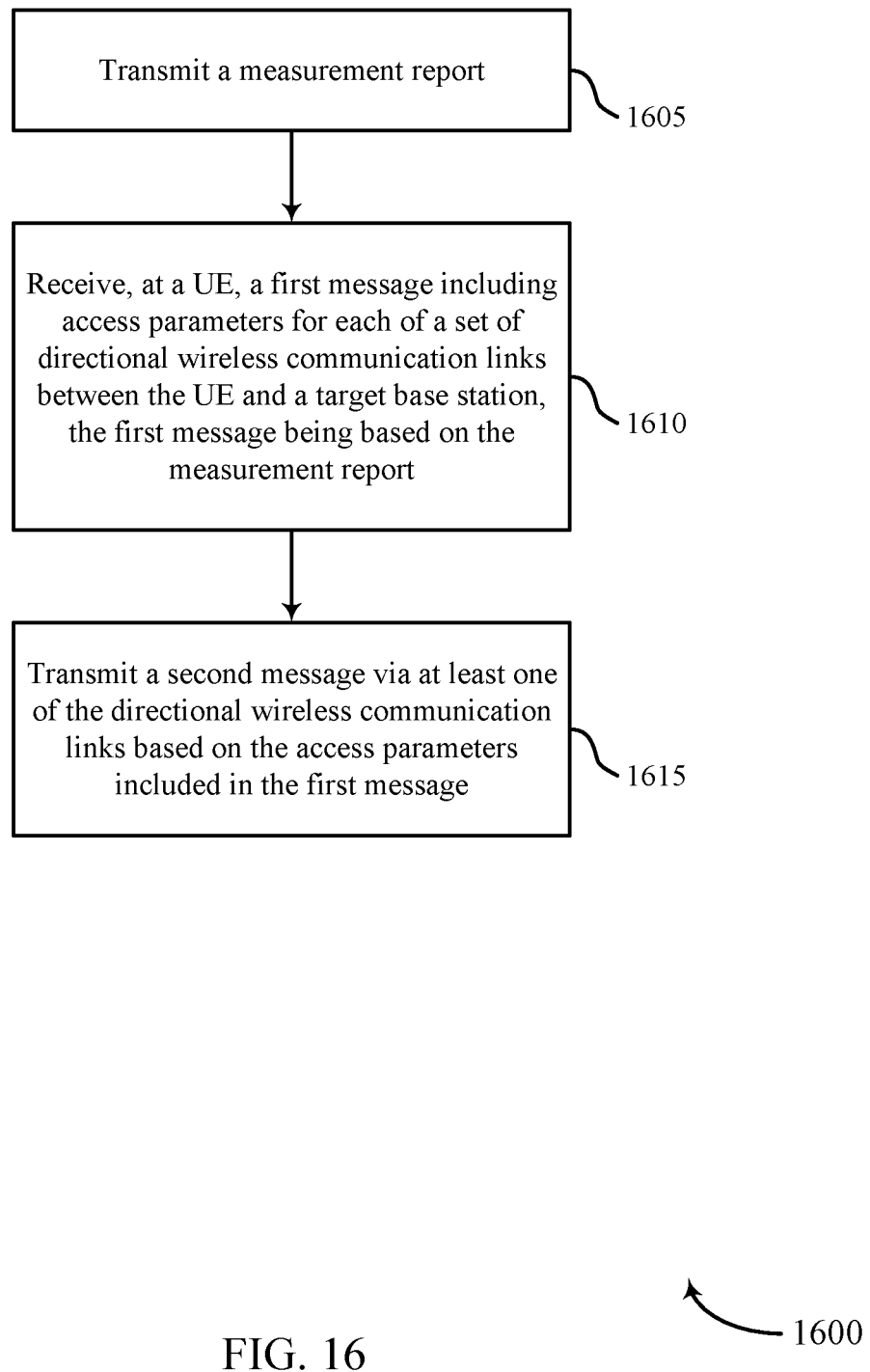

FIG. 16 shows a flowchart illustrating a method 1600 for techniques for handovers in the presence of directional wireless beams in accordance with various aspects of the present disclosure. The operations of method 1600 may be implemented by a UE 115 or its components as described herein. For example, the operations of method 1600 may be performed by a UE handover manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may transmit a measurement report. The operations of block 1605 may be performed according to the methods described with reference to FIGS. 1 through 5. In certain examples, aspects of the operations of block 1605 may be performed by a measurement report manager as described with reference to FIGS. 10 through 13.

At block 1610 the UE 115 may receive, at the UE, a first message comprising access parameters for each of a plurality of directional wireless communication links between the UE and a target base station, the first message being based at least in part on the measurement report. The operations of block 1610 may be performed according to the methods described with reference to FIGS. 1 through 5. In certain examples, aspects of the operations of block 1610 may be performed by a message manager as described with reference to FIGS. 10 through 13.

At block 1615 the UE 115 may transmit a second message via at least one of the directional wireless communication links based at least in part on the access parameters included in the first message. The operations of block 1615 may be performed according to the methods described with reference to FIGS. 1 through 5. In certain examples, aspects of the operations of block 1615 may be performed by a message manager as described with reference to FIGS. 10 through 13.

Figure 17:
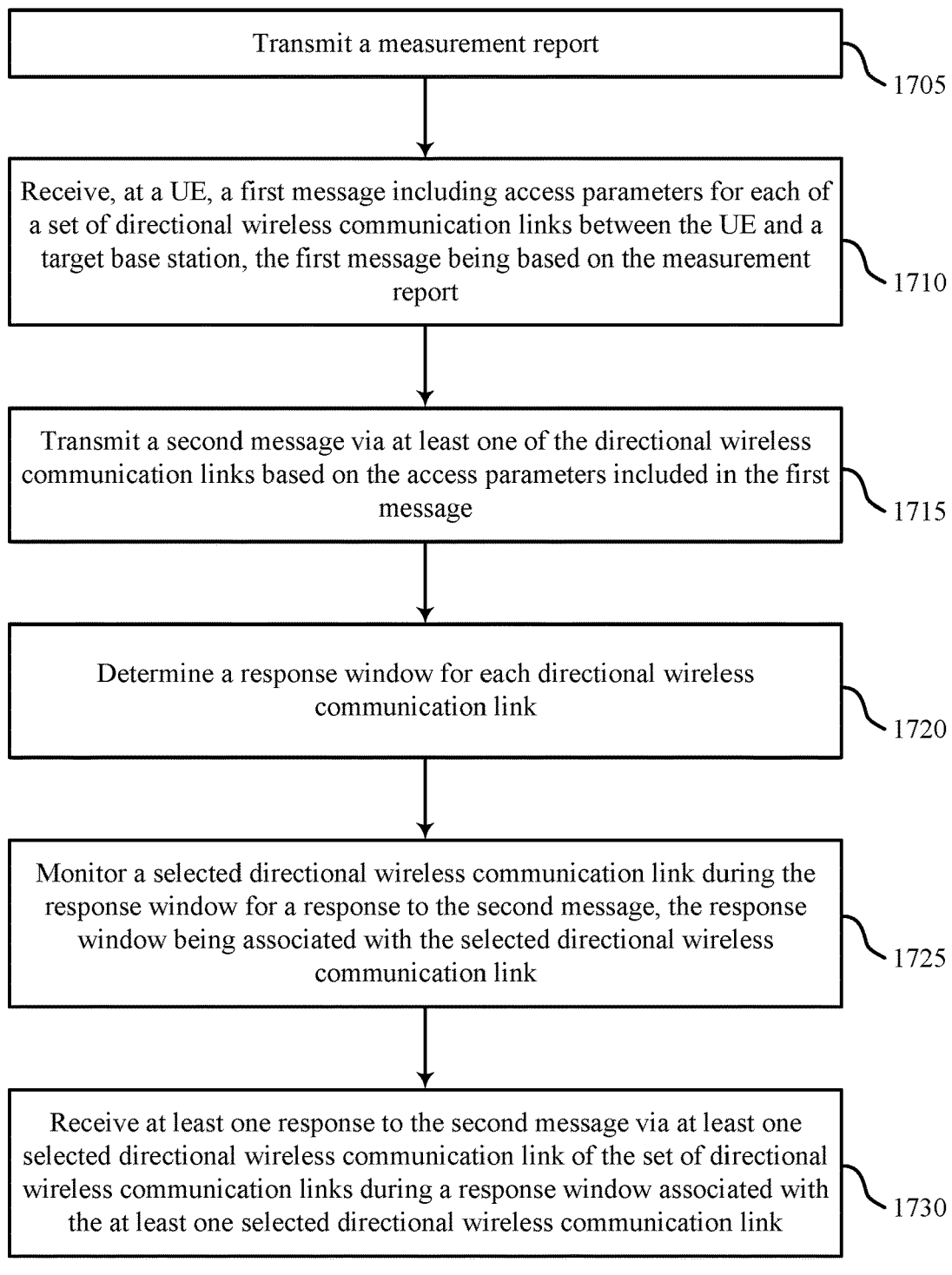

FIG. 17 shows a flowchart illustrating a method 1700 for techniques for handovers in the presence of directional wireless beams in accordance with various aspects of the present disclosure. The operations of method 1700 may be implemented by a UE 115 or its components as described herein. For example, the operations of method 1700 may be performed by a UE handover manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may transmit a measurement report. The operations of block 1705 may be performed according to the methods described with reference to FIGS. 1 through 5. In certain examples, aspects of the operations of block 1705 may be performed by a measurement report manager as described with reference to FIGS. 10 through 13.

At block 1710 the UE 115 may receive, at the UE, a first message comprising access parameters for each of a plurality of directional wireless communication links between the UE and a target base station, the first message being based at least in part on the measurement report. The operations of block 1710 may be performed according to the methods described with reference to FIGS. 1 through 5. In certain examples, aspects of the operations of block 1710 may be performed by a message manager as described with reference to FIGS. 10 through 13.

At block 1715 the UE 115 may transmit a second message via at least one of the directional wireless communication links based at least in part on the access parameters included in the first message. The operations of block 1715 may be performed according to the methods described with reference to FIGS. 1 through 5. In certain examples, aspects of the operations of block 1715 may be performed by a message manager as described with reference to FIGS. 10 through 13.

At block 1720 the UE 115 may determine a response window for each directional wireless communication link. In some examples, UE 115 may determine a response window based at least in part on the access parameters included in the first message. The operations of block 1720 may be performed according to the methods described with reference to FIGS. 1 through 5. In certain examples, aspects of the operations of block 1720 may be performed by a window manager as described with reference to FIGS. 10 through 13.

At block 1725 the UE 115 may monitor a selected directional wireless communication link during the response window for a response to the second message, the response window being associated with the selected directional wireless communication link. The operations of block 1725 may be performed according to the methods described with reference to FIGS. 1 through 5. In certain examples, aspects of the operations of block 1725 may be performed by a window manager as described with reference to FIGS. 10 through 13.

At block 1730 the UE 115 may receive at least one response to the second message via at least one selected directional wireless communication link of the plurality of directional wireless communication links during a response window associated with the at least one selected directional wireless communication link. The operations of block 1730 may be performed according to the methods described with reference to FIGS. 1 through 5. In certain examples, aspects of the operations of block 1730 may be performed by a communications manager as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of a LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for a handover of a user equipment (UE) from a serving base station to a target base station, comprising:
receiving, at the target base station, a measurement report;

selecting, by the target base station based at least in part on the measurement report, a plurality of directional wireless communication links from a total number of directional wireless communication links associated with the target base station;

generating, by the target base station based at least in part on the measurement report and the selecting, a first message comprising access parameters for each of the plurality of directional wireless communication links between the UE and the target base station, the access parameters indicating dedicated random access resources to the UE and comprising a first preamble index that is associated with a first directional wireless communication link of the plurality of directional wireless communication links, the dedicated random access resources comprising dedicated time resources;

transmitting, by the target base station, the first message to the UE via the serving base station, the first message indicating the dedicated random access resources comprising the dedicated time resources for each of the plurality of directional wireless communication links; and receiving, at the target base station from the UE based at least in part on the dedicated random access resources indicated in the first message, a second message via one or more of the plurality of directional wireless communication links included in the first message.

2. The method of claim 1, further comprising:
determining values for the access parameters for each directional wireless communication link.

3. The method of claim 2, wherein the determined values for the access parameters are based at least in part on estimated latency, network traffic, mobility parameters of the UE, availability of communication resources, or a combination thereof.

4. The method of claim 1, further comprising:
establishing a communication link with the UE using at least one of the plurality of directional wireless communication links.

5. The method of claim 1, wherein the access parameters include a preamble index, a physical random access channel (PRACH) mask index, or a beam index for each directional wireless communication link included in the first message.

6. The method of claim 1, wherein the access parameters include a response window for each directional wireless communication link included in the first message, the response window including a start time and a duration for the UE to monitor the directional wireless communication link associated with the response window.

7. The method of claim 6, wherein the response window associated with one or more of the plurality of directional wireless communication links does not overlap with response windows associated with other directional wireless communication links.

8. The method of claim 1, wherein the access parameters include a transmission window for each directional wireless communication link included in the first message, the transmission window being indicative of a dedicated time period to receive the second message from the UE via a specific directional wireless communication link of the plurality of directional wireless communication links.

9. The method of claim 1, wherein the access parameters include priority information associated with the plurality of directional wireless communication links, the priority information being indicative of a ranking of the plurality of directional wireless communication links.

10. The method of claim 1, further comprising:
receiving the second message from the UE via one of the plurality of directional wireless communication links included in the first message based at least in part on the access parameters included in the first message.

11. The method of claim 10, further comprising:
transmitting a response to the second message via the one of the plurality of directional wireless communication links included in the first message.

12. The method of claim 10, wherein the second message is a random access channel (RACH) message.

13. The method of claim 1, further comprising:
receiving the second message via each of the plurality of directional wireless communication links included in the first message; and
transmitting a response via each of the plurality of directional wireless communication links included in the first message.

14. The method of claim 1, wherein the measurement report and the first message are relayed between the UE and the target base station by the serving base station.

15. The method of claim 1, wherein the plurality of directional wireless communication links are millimeter wave (mmW) communication links.

16. A method for a handover of a user equipment (UE) from a serving base station to a target base station, comprising:
transmitting, by the UE, a measurement report;
receiving, at the UE, a first message comprising access parameters for each of a plurality of directional wireless communication links between the UE and the target base station, the access parameters indicating dedicated random access resources for each of the plurality of directional wireless communication links to the UE and comprising a first preamble index that is associated with a first directional wireless communication link of the plurality of directional wireless communication links, the dedicated random access resources comprising dedicated time resources; and
transmitting, by the UE to the target base station, a second message via at least one of the plurality of directional wireless communication links based at least in part on the access parameters indicating the dedicated random access resources included in the first message.

17. The method of claim 16, further comprising:
determining a response window for each directional wireless communication link.

18. The method of claim 17, wherein determining the response window for each directional wireless communication link is based at least in part on the access parameters included in the first message.

19. The method of claim 17, further comprising:
monitoring a selected directional wireless communication link during the response window for a response to the second message, the response window being associated with the selected directional wireless communication link.

20. The method of claim 17, wherein the response window associated with one or more of the plurality of directional wireless communication links does not overlap with response windows associated with any other of the plurality of directional wireless communication links.

21. The method of claim 16, further comprising:
receiving at least one response to the second message via at least one selected directional wireless communication link of the plurality of directional wireless communication links during a response window associated with the at least one selected directional wireless communication link.

22. The method of claim 16, further comprising:
measuring a first signal strength of the serving base station and a second signal strength of the target base station; and
generating the measurement report based at least in part on the first signal strength and the second signal strength.

23. The method of claim 16, further comprising:
selecting one or more directional wireless communication links of the plurality of directional wireless communication links.

24. The method of claim 23, wherein selecting the one or more directional wireless communication links is based at least in part on priority information.

25. The method of claim 23, wherein selecting the one or more directional wireless communication links is based at least in part on channel conditions measured by the UE of the one or more directional wireless communication links.

26. The method of claim 16, further comprising:
determining a mobility state of the UE; and
generating the measurement report that includes the mobility state of the UE.

27. The method of claim 16, wherein the second message is a random access channel (RACH) message.

28. An apparatus for a handover of a user equipment (UE) from a serving base station to a target base station, in a system comprising:
one or more processors; and
memory coupled with the one or more processors, the one or more processors configured to cause the apparatus to:
receive, at the target base station, a measurement report;
select, by the target base station based at least in part on the measurement report, a plurality of directional wireless communication links from a total number of directional wireless communication links associated with the target base station;
generate, by the target base station based at least in part on the measurement report and the selecting, a first message comprising access parameters for each of the plurality of directional wireless communication links between the UE and the target base station, the access parameters indicating dedicated random access resources to the UE and comprising a first preamble index that is associated with a first directional wireless communication link of the plurality of directional wireless communication links, the dedicated random access resources comprising dedicated time resources;
transmit by the target base station, the first message to the UE via the serving base station, the first message indicating the dedicated random access resources comprising the dedicated time resources for each of the plurality of directional wireless communication links; and
receive, at the target base station from the UE based at least in part on the dedicated random access resources indicated in the first message, a second message via one or more of the plurality of directional wireless communication links included in the first message.

29. The apparatus of claim 28, wherein the one or more processors is further configured to cause the apparatus to:
determine values for the access parameters for each directional wireless communication link.

30. The apparatus of claim 29, wherein the determined values for the access parameters are based at least in part on estimated latency, network traffic, mobility parameters of the UE, availability of communication resources, or a combination thereof.

31. The apparatus of claim 28, wherein the one or more processors is further configured to cause the apparatus to:
establish a communication link with the UE using at least one of the plurality of directional wireless communication links.

32. The apparatus of claim 28, wherein the access parameters include a preamble index, a physical random access channel (PRACH) mask index, or a beam index for each directional wireless communication link included in the first message.

33. The apparatus of claim 28, wherein the access parameters include a response window for each directional wireless communication link included in the first message, the response window including a start time and a duration for the UE to monitor the directional wireless communication link associated with the response window.

34. The apparatus of claim 33, wherein the response window associated with one or more of the plurality of directional wireless communication links does not overlap with response windows associated with other directional wireless communication links.

35. The apparatus of claim 28, wherein the access parameters include a transmission window for each directional wireless communication link included in the first message, the transmission window being indicative of a dedicated time period to receive the second message from the UE via a specific directional wireless communication link of the plurality of directional wireless communication links.

36. The apparatus of claim 28, wherein the access parameters include priority information associated with the plurality of directional wireless communication links, the priority information being indicative of a ranking of the plurality of directional wireless communication links.

37. The apparatus of claim 28, wherein the one or more processors is further configured to cause the apparatus to:
receive the second message from the UE via one of the plurality of directional wireless communication links included in the first message based at least in part on the access parameters included in the first message.

38. The apparatus of claim 37, wherein the one or more processors is further configured to cause the apparatus to:
transmit a response to the second message via the one of the plurality of directional wireless communication links included in the first message.

39. The apparatus of claim 37, wherein the second message is a random access channel (RACH) message.

40. The apparatus of claim 28, wherein the one or more processors is further configured to cause the apparatus to:
receive the second message via each of the plurality of directional wireless communication links included in the first message; and
transmit a response via each of the plurality of directional wireless communication links included in the first message.

41. The apparatus of claim 28, wherein the measurement report and the first message are relayed between the UE and the target base station by the serving base station.

42. The apparatus of claim 28, wherein the plurality of directional wireless communication links are millimeter wave (mmW) communication links.

43. An apparatus for a handover of a user equipment (UE) from a serving base station to a target base station, in a system comprising:
one or more processors; and
memory coupled with the one or more processors, the one or more processors configured to cause the apparatus to:
transmit, by the UE, a measurement report;
receive, at the UE, a first message comprising access parameters for each of a plurality of directional wireless communication links between the UE and the target base station, the access parameters indicating dedicated random access resources for each of the plurality of directional wireless communication links to the UE and comprising a first preamble index that is associated with a first directional wireless communication link of the plurality of directional wireless communication links, the dedicated random access resources comprising dedicated time resources; and
transmit, by the UE to the target base station, a second message via at least one of the plurality of directional wireless communication links based at least in part on the access parameters indicating the dedicated random access resources included in the first message.

44. The apparatus of claim 43, wherein the one or more processors is further configured to cause the apparatus to:
determine a response window for each directional wireless communication link.

45. The apparatus of claim 44, wherein determining the response window for each directional wireless communication link is based at least in part on the access parameters included in the first message.

46. The apparatus of claim 44, wherein the one or more processors is further configured to cause the apparatus to:
monitor a selected directional wireless communication link during the response window for a response to the second message, the response window being associated with the selected directional wireless communication link.

47. The apparatus of claim 44, wherein the response window associated with one or more of the plurality of directional wireless communication links does not overlap with response windows associated with any other of the plurality of directional wireless communication links.

48. The apparatus of claim 43, wherein the one or more processors is further configured to cause the apparatus to:
receive at least one response to the second message via at least one selected directional wireless communication link of the plurality of directional wireless communication links during a response window associated with the at least one selected directional wireless communication link.

49. The apparatus of claim 43, wherein the one or more processors is further configured to cause the apparatus to:
measure a first signal strength of the serving base station and a second signal strength of the target base station; and
generate the measurement report based at least in part on the first signal strength and the second signal strength.

50. The apparatus of claim 43, wherein the one or more processors is further configured to cause the apparatus to:
select one or more directional wireless communication links of the plurality of directional wireless communication links.

51. The apparatus of claim 50, wherein selecting of the one or more directional wireless communication links is based at least in part on priority information.

52. The apparatus of claim 50, wherein selecting of the one or more directional wireless communication links is based at least in part on channel conditions measured by the UE of the one or more directional wireless communication links.

53. The apparatus of claim 43, wherein the one or more processors is further configured to cause the apparatus to:
determine a mobility state of the UE; and
generate the measurement report that includes the mobility state of the UE.

54. The apparatus of claim 43, wherein the second message is a random access channel (RACH) message.

55. An apparatus for a handover of a user equipment (UE) from a serving base station to a target base station, comprising:
means for receiving, at the target base station, a measurement report;
means for selecting, by the target base station based at least in part on the measurement report, a plurality of directional wireless communication links from a total number of directional wireless communication links associated with the target base station;
means for generating, by the target base station based at least in part on the measurement report and the selecting, a first message comprising access parameters for each of the plurality of directional wireless communication links between the UE and the target base station, the access parameters indicating dedicated random access resources to the UE and comprising a first preamble index that is associated with a first directional wireless communication link of the plurality of directional wireless communication links, the dedicated random access resources comprising dedicated time resources;
means for transmitting, by the target base station, the first message to the UE via the serving base station, the first message indicating the dedicated random access resources comprising the dedicated time resources for each of the plurality of directional wireless communication links; and
means for receiving, at the target base station from the UE based at least in part on the dedicated random access resources indicated in the first message, a second message via one or more of the plurality of directional wireless communication links included in the first message.

56. An apparatus for a handover of a user equipment (UE) from a serving base station to a target base station, comprising:
means for transmitting, by the UE, a measurement report;
means for receiving, at the UE, a first message comprising access parameters for each of a plurality of directional wireless communication links between the UE and the target base station, the access parameters indicating dedicated random access resources for each of the plurality of directional wireless communication links to the UE and comprising a first preamble index that is associated with a first directional wireless communication link of the plurality of directional wireless communication links, the dedicated random access resources comprising dedicated time resources; and
means for transmitting, by the UE to the target base station, a second message via at least one of the plurality of directional wireless communication links based at least in part on the access parameters indicating the dedicated random access resources included in the first message.

57. A non-transitory computer readable medium storing code for a handover of a user equipment (UE) from a serving base station to a target base station, the code comprising instructions executable by one or more processors to:
receive, at the target base station, a measurement report;
select, by the target base station based at least in part on the measurement report, a plurality of directional wireless communication links from a total number of directional wireless communication links associated with the target base station;
generate, by the target base station based at least in part on the measurement report and the selecting, a first message comprising access parameters for each of the plurality of directional wireless communication links between the UE and the target base station, the access parameters indicating dedicated random access resources to the UE and comprising a first preamble index that is associated with a first directional wireless communication link of the plurality of directional wireless communication links, the dedicated random access resources comprising dedicated time resources;
transmit, by the target base station, the first message to the UE via the serving base station, the first message indicating the dedicated random access resources comprising the dedicated time resources for each of the plurality of directional wireless communication links; and
receive, at the target base station from the UE based at least in part on the dedicated random access resources indicated in the first message, a second message via one or more of the plurality of directional wireless communication links included in the first message.

58. A non-transitory computer readable medium storing code for a handover of a user equipment (UE) from a serving base station to a target base station, the code comprising instructions executable by one or more processors to:
transmit, by the UE, a measurement report;
receive, at the UE, a first message comprising access parameters for each of a plurality of directional wireless communication links between the UE and the target base station, the access parameters indicating dedicated random access resources for each of the plurality of directional wireless communication links to the UE and comprising a first preamble index that is associated with a first directional wireless communication link of the plurality of directional wireless communication links, the dedicated random access resources comprising dedicated time resources; and
transmit, by the UE to the target base station, a second message via at least one of the plurality of directional wireless communication links based at least in part on the access parameters indicating the dedicated random access resources included in the first message.

* * * * *